United States Patent
Zeng et al.

(10) Patent No.: US 11,157,134 B2
(45) Date of Patent: Oct. 26, 2021

(54) INTERFACES FOR A MESSAGING INBOX

(71) Applicant: Facebook, Inc., Menlo Park, CA (US)

(72) Inventors: Sharon Zeng, San Francisco, CA (US); Leo Litterello Mancini, San Francisco, CA (US); Andrew Buteau, Sunnyvale, CA (US); Ashot Petrosian, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 100 days.

(21) Appl. No.: 15/647,503

(22) Filed: Jul. 12, 2017

(65) Prior Publication Data

US 2019/0018570 A1    Jan. 17, 2019

(51) Int. Cl.

| | | |
|---|---|---|
| *G06F 3/048* | (2013.01) | |
| *G06F 3/0481* | (2013.01) | |
| *G06F 3/0482* | (2013.01) | |
| *G06F 3/0485* | (2013.01) | |
| *G06F 3/0484* | (2013.01) | |
| *G06Q 50/00* | (2012.01) | |
| *H04L 12/58* | (2006.01) | |

(52) U.S. Cl.
CPC ........ *G06F 3/04817* (2013.01); *G06F 3/0482* (2013.01); *G06F 3/04845* (2013.01); *G06F 3/04855* (2013.01); *G06Q 50/01* (2013.01); *H04L 51/22* (2013.01); *H04L 51/32* (2013.01); *H04L 51/16* (2013.01)

(58) Field of Classification Search
CPC ............. G06F 3/04817; G06F 3/04855; G06F 3/0481; G06F 3/0482; G06F 3/04845; H04L 51/22; H04L 51/32; H04L 51/16; G06Q 50/01
See application file for complete search history.

(56) References Cited

U.S. PATENT DOCUMENTS

| | | |
|---|---|---|
| 8,930,531 B2 | 1/2015 | Caunter et al. |
| 2006/0031336 A1* | 2/2006 | Friedman ............. G06Q 10/107 709/206 |
| 2007/0054679 A1* | 3/2007 | Cho ...................... H04M 1/576 455/466 |
| 2009/0144320 A1 | 6/2009 | Weinberg et al. |
| 2012/0124147 A1 | 5/2012 | Hamlin et al. |

(Continued)

*Primary Examiner* — Mahelet Shiberou
(74) *Attorney, Agent, or Firm* — Kacvinsky Daisak Bluni PLLC

(57) ABSTRACT

Exemplary embodiments relate to techniques for representing conversations in a messaging system, where content serves as the organizing feature or primitive of a messaging inbox. In the messaging inbox, a first level of organization allows for the selection of a user account associated with shared content. Upon selecting the user account, the account's content (e.g., photographs, videos, etc.) appear as a second level of organization. Thus, content may be aggregated in two hierarchical tiers: first, on a per-sender basis, and second on a per-content basis. In some embodiments, messages generated in response to the content may be displayed on the content. The content may be made progressively darker as more replies are received. Messages can be made temporary using a number of different ephemerality models. Messages may also be made permanent, with previously shared content shown in respective inbox drawers.

16 Claims, 23 Drawing Sheets

(56) References Cited

U.S. PATENT DOCUMENTS

| | | | |
|---|---|---|---|
| 2012/0185797 A1* | 7/2012 | Thorsen | G06Q 10/00 |
| | | | 715/784 |
| 2013/0242708 A1* | 9/2013 | Siu | G06Q 10/109 |
| | | | 368/10 |
| 2014/0344383 A1 | 11/2014 | Odell et al. | |
| 2015/0094106 A1* | 4/2015 | Grossman | H04M 1/72552 |
| | | | 455/466 |
| 2016/0344667 A1* | 11/2016 | Lane | H04L 51/08 |
| 2017/0011434 A1* | 1/2017 | Goria | G06Q 30/0277 |
| 2017/0046024 A1* | 2/2017 | Dascola | H04M 1/72522 |

\* cited by examiner

Display Logic 400

Centralized Communication System 500

Distributed Communications System
550

INTERFACES FOR A MESSAGING INBOX

BACKGROUND

Communications systems, including messaging services, social networking services, etc. allow users to converse with each other by exchanging messages or other types of conversation content. Conventional systems may organize their interfaces and message data structures around a conversational organization model: messages are organized into conversations based on the conversation's participants, and messages are displayed in a chronological order within the conversation.

DETAILED DESCRIPTION

Conventional systems that organize messages by conversations/participants entail certain tradeoffs. For example, in such a conversational system, there is generally an expectation that messages will generate replies; if a user sends a message and receives no replies, the user may feel that their message failed to resonate with conversation participants. Thus, traditional systems may be useful for conducting conversations, but may not be well-suited to sharing content without an expectation of receiving a reply.

Figure 1A:
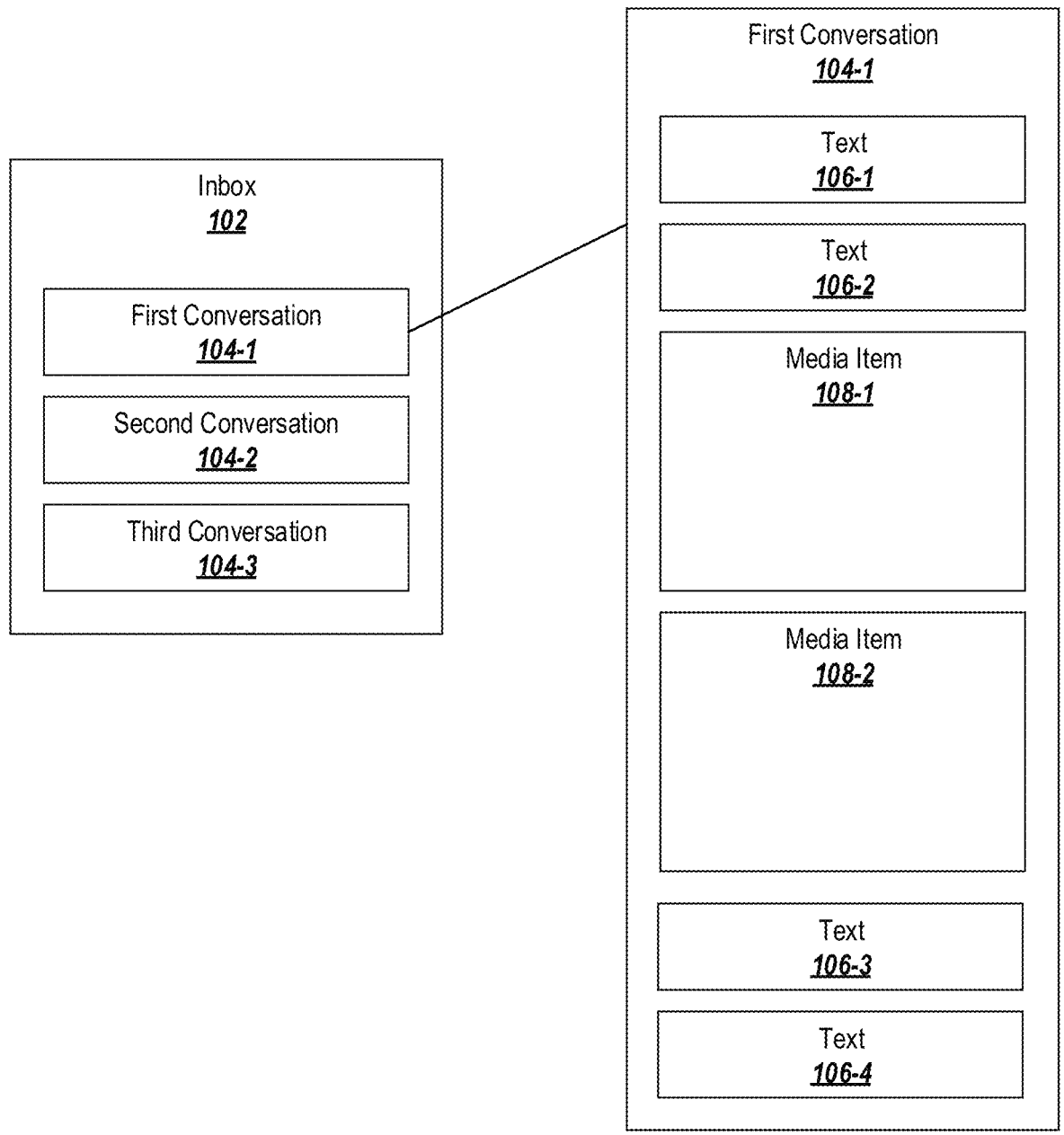
FIG. 1A depicts an exemplary hierarchical structure for organizing conversation content.

For example, FIG. 1A depicts a model in which an inbox 102 is organized into conversations 104-$i$. A conversation may be defined by the participants in the conversation; for example, a first conversation 104-1 may be a three-way conversation between three users Jack, John, and Joe, whereas a second conversation 104-2 may be a one-on-one conversation between Jack and Jill.

Each conversation 104-$i$ may include a number of messages or content. For example, the first conversation 104-1 depicted in FIG. 1A includes several textual messages 106-$i$ and several media items 108-$i$. The media items 108-$i$ may include, for example, images (e.g., photos or GIFs), videos, audio recordings, hyperlinks, news items, etc.

Although this organization may be conducive to conducting conversations between participants, there is generally an expectation that any given message 106-$i$, 108-$i$ will invite further conversation. However, in some cases, a user may wish to share content without necessarily sparking a conversation. If other users wish to reply to content, it may be desirable to allow them to do so; nonetheless, replies may not be expected. The organizational model of FIG. 1A may therefore not be well-suited to general content sharing.

This organizational model may also create ambiguities regarding replies to media items 108-$i$. For example, consider the scenario where a first user shares a first media item 108-1 in the conversation, and a second user shares a second media item 108-2 in the conversation. If the media items 108-$i$ are then followed by a textual reply 106-3 from a third user, it may be unclear whether the third user was responding to the first media item 108-1 or the second media item 108-2.

Furthermore, some communications system may implement ephemerality for media items 108-$i$. In other words, the media items 108-$i$ may expire or be removed under certain conditions. When ephemerality is time-based (e.g., the media items 108-$i$ expire after a predetermined period of time, such as 24 hours), the model depicting in FIG. 1A may be a reasonable approach. A server facilitating the conversation may store the media item 108-$i$, and the media item 108-$i$ may simply be deleted from the server when the predetermined time expires. The media item 108-$i$ may also be deleted from the conversation 104-$i$, or may be replaced by a generic placeholder.

However, ephemerality may also be based on factors other than time. For example, according to exemplary embodiments described herein, ephemerality may be based on the number of times that the media item 108-$i$ is viewed (e.g., in a visualization interface). In one example, a media item 108-$i$ may be sent to multiple recipients, and may expire after the recipients view the media item once or twice, but do not reply to the media item (a reply may keep the media item alive for a certain amount of time or a certain additional number of views, or while replies continue to be generated).

In this case, media items 108-$i$ may expire at different times for different users. However, in the organizational model depicted in FIG. 1A, the media items 108-$i$ may be tied to or associated with a particular conversation 104-$i$. In other words, in the representation on the facilitating server, the server may maintain a media item 108-$i$ and an identifier (e.g. at thread ID) for the conversation 104-*i* to which the media item 108-*i* belongs. When conversation data is requested by a client of one of the participants, the server may not know whether the media item 108-*i* has expired for this particular user. It may therefore be difficult, in this situation, to expire a media item 108-*i* at the server on a different basis for different users because expiration information may be unavailable.

On the other hand, if the server tracks media item expiration for individual users, additional data must be stored at the server (consuming additional memory resources) and the server may need to filter each media item in a conversation based on the stored data (consuming additional processing resources). Moreover, when media items expire at different times for different conversation participants, the conversation 104-*i* may appear differently for each conversation participant (e.g., some participants may continue to see that a media item 108-*i* exists at a certain location in the conversation, whereas the media item 108-*i* may be removed for other participants). Thus, some replies in the conversation 104-*i* by participants that can see a media item 108-*i* may not make sense to users who cannot see the media item 108-*i* because it has expired.

In the above example, a conversation based on a specified group of participants serves as the organizational focus. Exemplary embodiments described herein may utilize an alternative organizational model, in which content such as media items 108-*i* serve as primitives or organizing features. Content may be aggregated in two hierarchical tiers: first, on a per-sender basis, and second on a per-content basis. Content may be transmitted to multiple recipients, but replies to content may be added to one-on-one conversations between the sender and the replier. Such an organizational model may be more conducive to sharing content as compared to the model depicted in FIG. 1A.

Figure 1B:
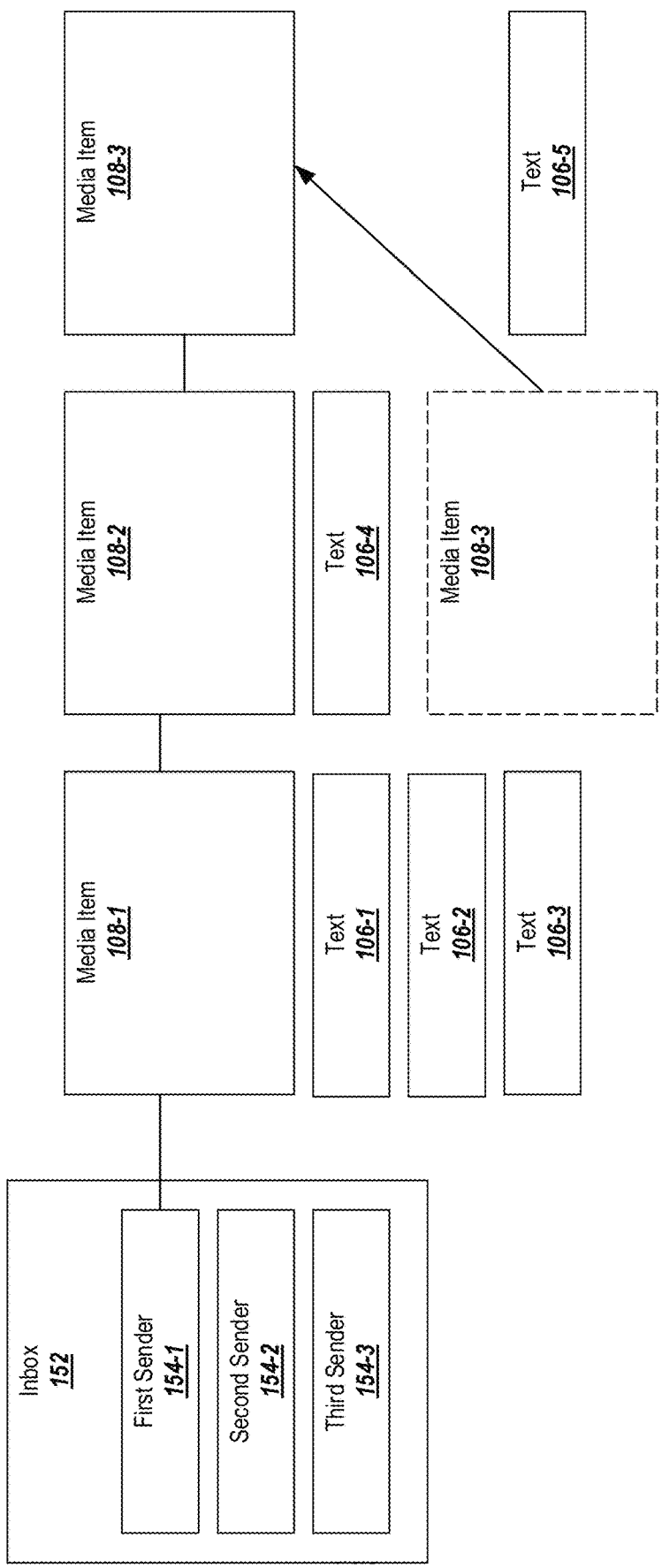
FIG. 1B depicts an alternative hierarchical structure for organizing conversation content.

For instance, FIG. 1B depicts an alternative hierarchical structure for organizing conversation content. A first level of organization allows for the selection of another user who has shared some content. Once the user is selected, the user's content (e.g., photographs, videos, etc.) appears. Upon selecting the content, any messages generated in response to the content may be displayed. The content therefore serves as the organizing feature of the inbox.

In this example, an inbox 152 is organized based on the sender 154-*i* of each media item 108-*i*; media items 108-*i* are aggregated on a per-sender 154-*i* basis, rather than being included on a per-conversation basis as in the previous example.

Upon selecting a sender 154-*i* in the inbox 152, the interface may change to a content visualization interface for showing a particular media item 108-*i* (e.g., the first media item 108-1). The user may be permitted to reply to the media item, and textual replies 106-*i* may be displayed in conjunction with the media item 108-*i* (e.g., replies may be displayed on top of the media item 108-*i*).

A user may advance through different media items 108-*i* available from a particular user (e.g., active content, such as unexpired ephemeral content). Replies may be associated with the media item 108-*i* that they were generated in reference to. A user may submit textual replies 106-*i* to a media item 108-*i*, or may reply to a media item 108-*i* with another media item (e.g., in the case of the third media item 108-3 in FIG. 1B). If a user replies to a media item (e.g., 108-2) with another media item (e.g., 108-3), then the media item 108-3 for the reply may cause a new conversation based around the replying media item 108-3 to be generated. The new conversation may be a one-on-one conversation between the original sender and the replier. In some embodiments, the media items 108-*i* in the visualization interface may be made progressively darker as more replies are received. This progressive darkening is based on the assumption that as more replies are received, the intent of the users shifts from sharing content to conducting a conversation (where the content becomes progressively less relevant than the conversation).

In some embodiments, ephemeral content that permits a certain number of views may remain unexpired (or a view counter may remain un-incremented) until the user advances through each media item 108-*i* available from a particular sender and/or exits the visualization interface. Furthermore, the user may be given an opportunity to reply to a media item 108-*i*, in which case the media item may remain unexpired. For example, the media item 108-*i* may be preserved for a further predetermined period of time, or for a further predetermined number of views, or may continue to remain unexpired during a period in which replies are actively generated for the media item 108-*i*. In further embodiments, some or all messages may be made permanent, with an inbox drawer scrolls to show previously shared content.

Figure 2A:
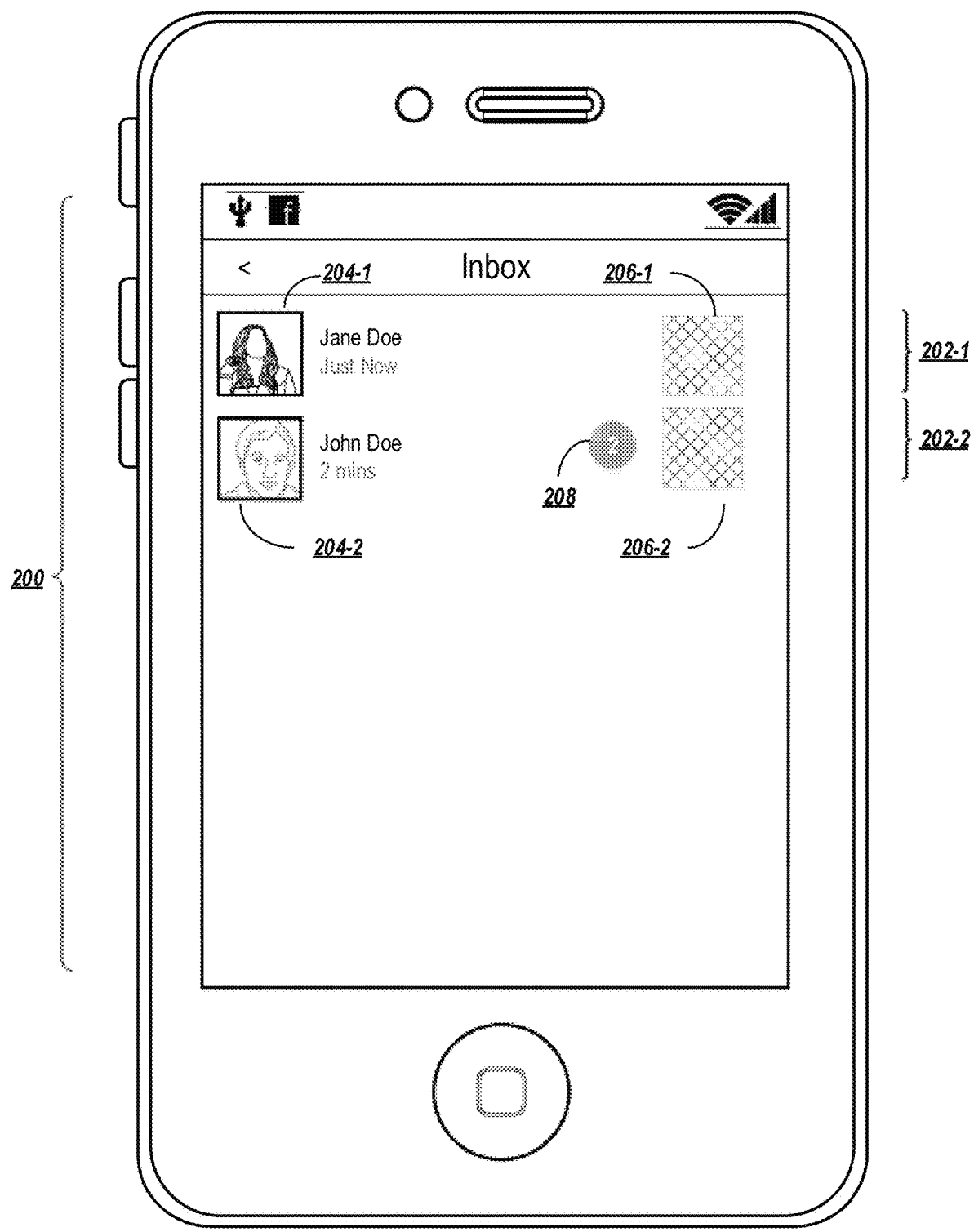
FIG. 2A depicts an exemplary interface for a messaging inbox.
Figure 2B:
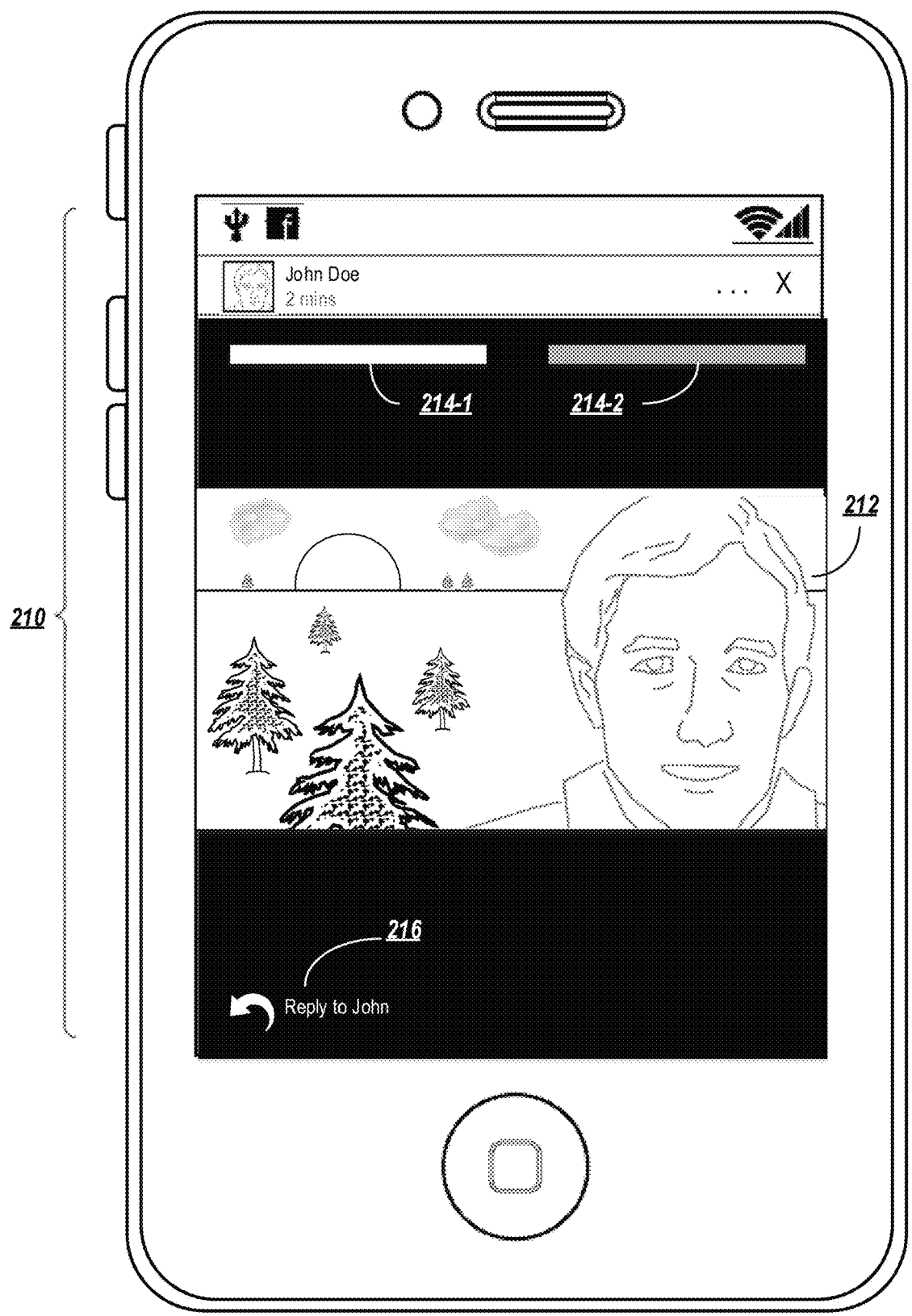
FIG. 2B depicts an exemplary interface for visualizing received content.

In order to implement the organizational model depicted in FIG. 2B, conversational threads may be stored in "buckets" represented by a relationship tuple of the form (sender, receiver). Individual content threads are represented by a conversation tuple of the form (content ID, sender, receiver).

One piece of content may be associated with multiple conversations using the content ID. Replies may be organized in a hierarchy under the conversation tuple. This structure may allow ephemerality models to be implemented more efficiently, as it may be simpler to tie ephemerality to the conversation tuple rather than the relationship tuple (as might have been required in conventional models based on conversations identified by the relationship tuple).

Furthermore, different ephemerality rules may be applied using this model. For example, ephemerality may be made to apply only to content by refraining from showing content associated with the content ID when displaying a conversation based on the conversation tuple. Alternatively or in addition, ephemerality may be applied to content and the subsequent replies by removing an entire conversation tuple from a relationship bucket. It also facilitates different users viewing the content at different times, since the conversation tuple can be removed from a particular sender's bucket without removing the associated content from the server.

This brief summary is intended to serve as a non-limiting introduction to the concepts discussed in more detail below. However, before discussing further exemplary embodiments, a brief note on data privacy is first provided. A more detailed description of privacy settings and authentication will be addressed in connection with the following Figures.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous video conversation in a messaging system is next provided As an aid to understanding, a series of examples will first be presented before detailed descriptions of the underlying implementations are described. It is noted that these examples are intended to be illustrative only and that the present invention is not limited to the embodiments shown.

Exemplary Interfaces

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

FIG. 2A depicts an exemplary interface 200 for a messaging inbox. For example, the inbox interface 200 may be a main or sub menu of an application associated with a communications service, such as a messaging application or social networking application. The inbox interface 200 may be displayed upon initially opening the application and/or when an instruction to display the inbox is received. The interface 200 may be displayed on a device, such as a mobile device, associated with a user of the communications service.

The interface 200 may display one or more account elements 202-$i$ associated with user accounts that the user of the communications service may wish to message. For example, an account element 202-$i$ may be displayed for each user account from which content has been recently received, and/or for each user account to which content has been recently sent. The account elements 202-$i$ may further include frequently-messaged contacts, contacts of particular relevance, etc. One account element 202-$i$ may be displayed for each contact in the user's contacts book, or only a subset of the user's contacts may be associated with an account element 202-$i$ in the interface 200.

Each of the account elements 202-$i$ may be associated with account information 204-$i$ describing the user associated with the account element (e.g., a picture, a name, an identifier or handle, when the user last shared content or was most recently active, etc.).

Shared content that is available from the user associated with the account element 202-$i$ may be represented in a content preview 206-$i$. The content preview may include, for example, a thumbnail or reduced size representation of the content, a portion of the content, etc. If the content is ephemeral, then the content preview 206-$i$ associated with the content may be distorted, such as by being blurred, pixelated, etc, in order to prevent the user from viewing the content until it is opened in a visualization interface.

An account element 202-$i$ may be associated with more than one unit of shared content. Accordingly, a content amount indicator 208 may be displayed in connection with the account element 208-$i$. The content amount indicator 208 may display or otherwise represent the number of content items currently available from the account associated with the account element 202-$i$.

Upon receiving a selection of an account element 202-$i$, a content item associated with the account element 202-$i$ may be displayed in a visualization interface, such as the visualization interface 210 depicted in FIG. 2B.

FIG. 2B depicts an exemplary visualization interface 210 for visualizing received content. The visualization interface 210 may include a content display 212 which displays a copy of the content. The copy may be displayed in a format that substantially fills at least one of the dimensions of the display.

If multiple content items are available, the system may order the content items (e.g., with a most-recently-received content item first, a content item most recently replied-to first) and display the content items in the determined order. One or more content indicator bars 214-$i$ may be displayed to indicate how many content items are available, and the location in the list of content items that the user is currently viewing. For example, in FIG. 2B, the first indicator bar 214-1 is white to indicate that the user is currently viewing the first content item. A second indicator bar 214-2 is colored gray to indicate that a second content item remains to be viewed. The number of indicator bars 214-$i$ may correspond to the number displayed in the content amount indicator 208 of the inbox interface 200.

The visualization interface 210 may include a reply element 216 allowing a user to generate a reply to the content item displayed in the content display 212. Upon receiving a selection of the reply element 216, the system may present a reply interface 218, as depicted for example in FIG. 2C.

The reply interface 218 may include a reply preview 220 for previewing textual information (e.g., entered via an on-screen keyboard or other input device) entered as part of the reply.

The reply may also or alternatively include content, such as an image, video, etc. Accordingly, a content generator element 222 may be provided on the reply interface 218 for including content as the reply, or as part of the reply. Selecting the content generator element 222 may cause a content generation interface to be displayed (see, e.g., FIG. 2J).

When the reply in the reply preview 220 is acceptable, a finalize element 224 may be selected to finalize and transmit the reply. After finalizing the reply, the interface may revert to the visualization interface 210, as shown in FIG. 2D. The reply 226 may be displayed, e.g., on the content in the content display 212, or in another part of the visualization interface 210.

Figure 2C:
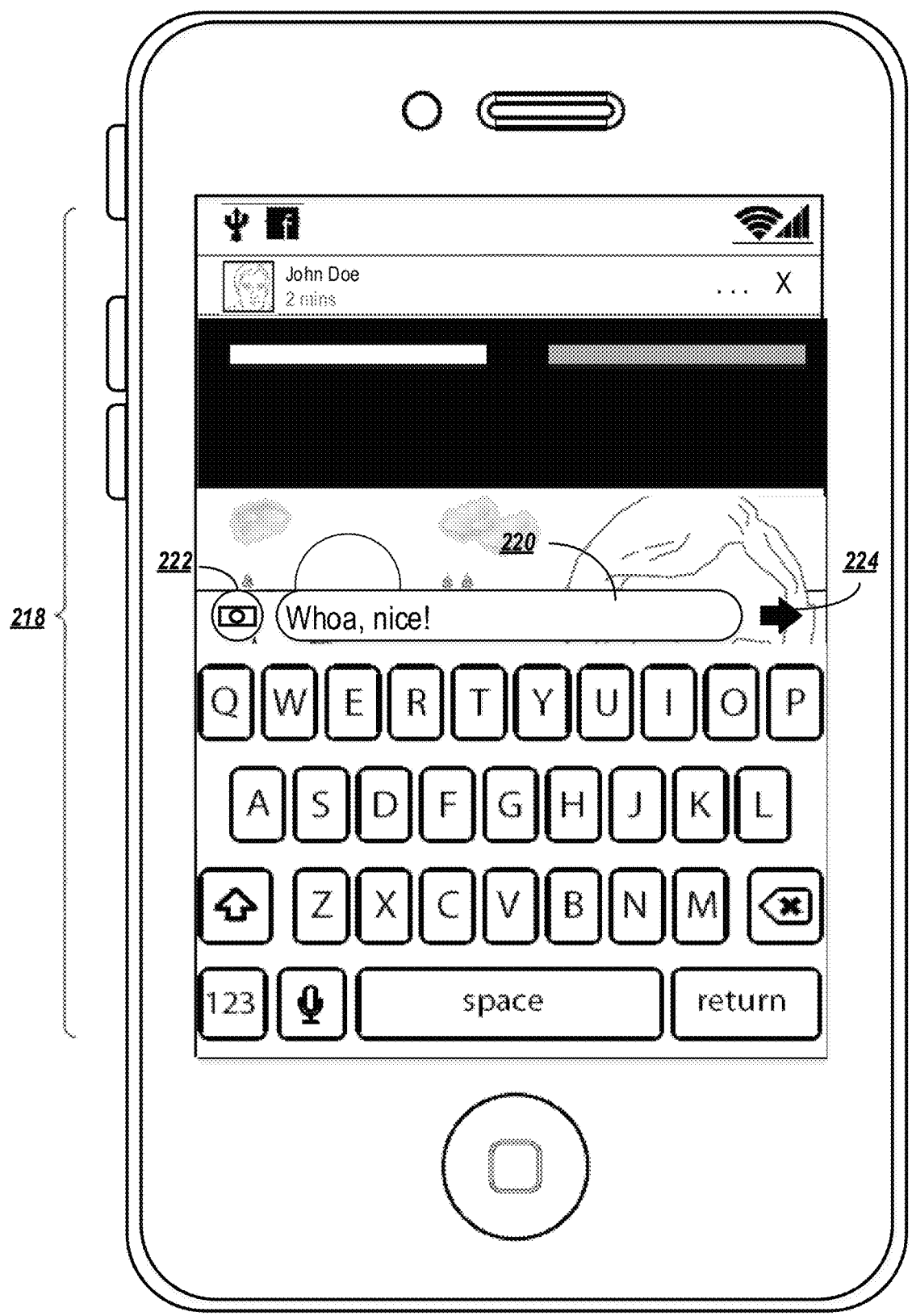
FIG. 2C depicts an exemplary interface for generating a reply to received content.
Figure 2D:
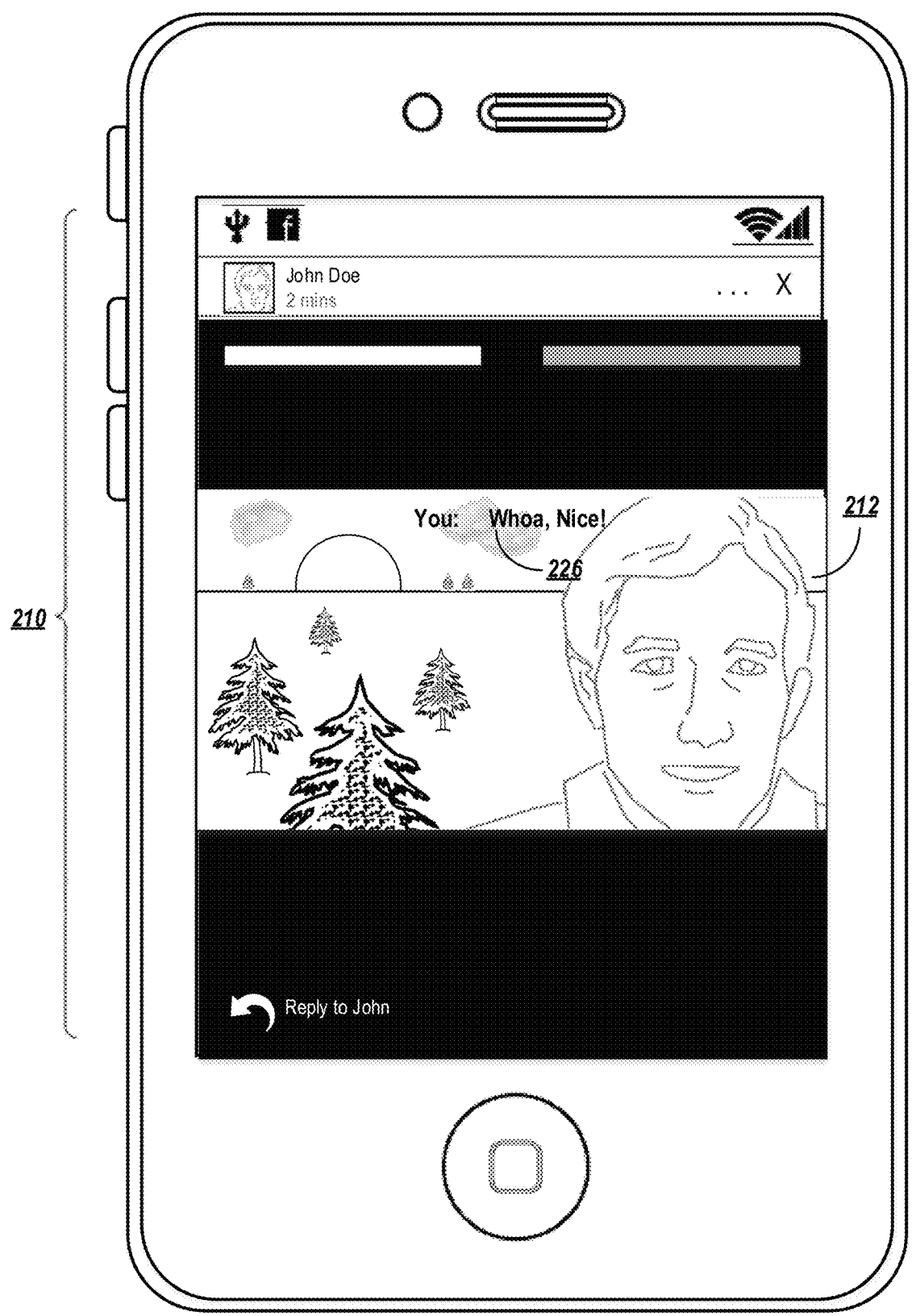
FIG. 2D depicts the visualization interface after a first reply is received.
Figure 2E:
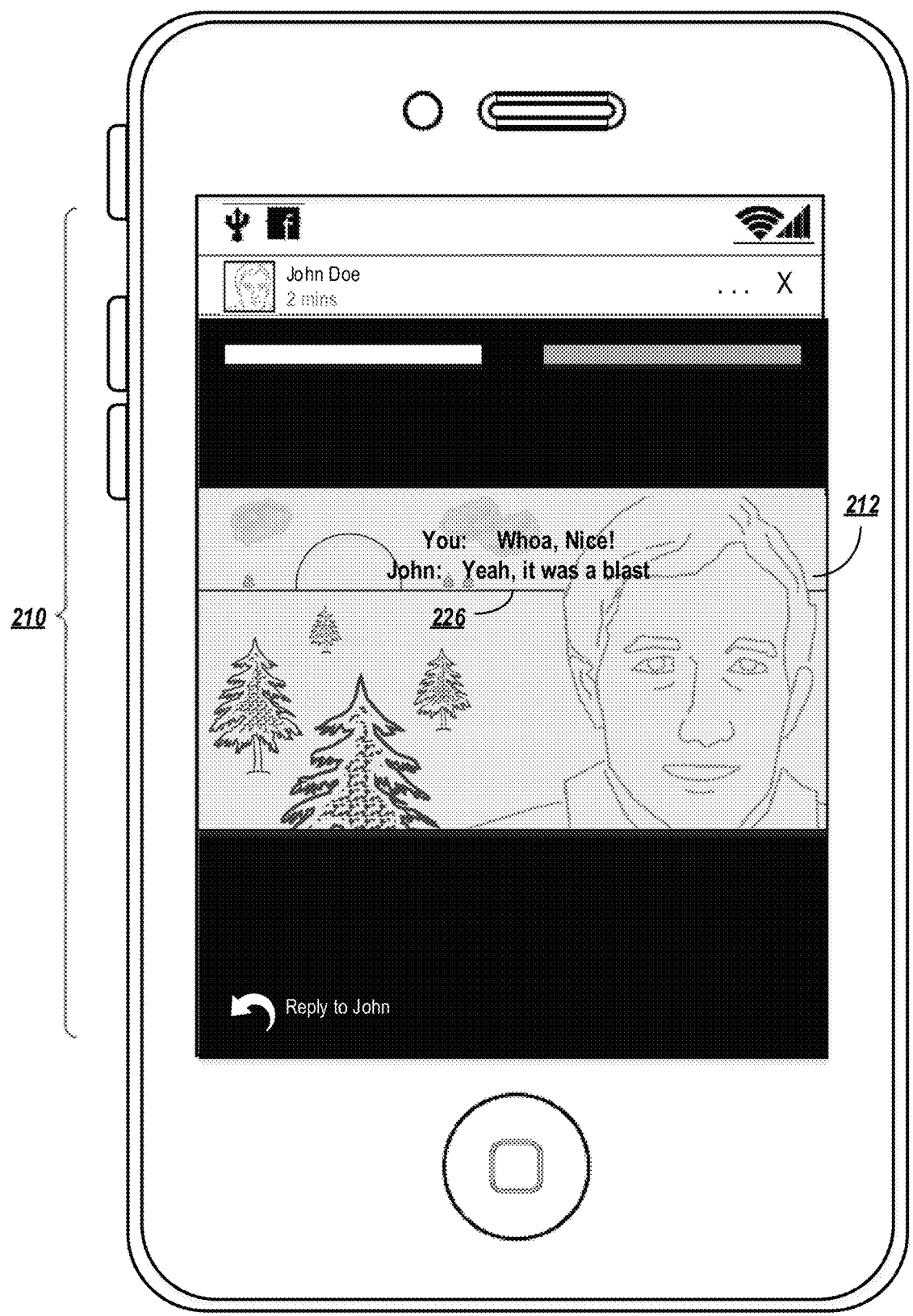
FIG. 2E depicts the visualization interface after a second reply is received.
Figure 2F:
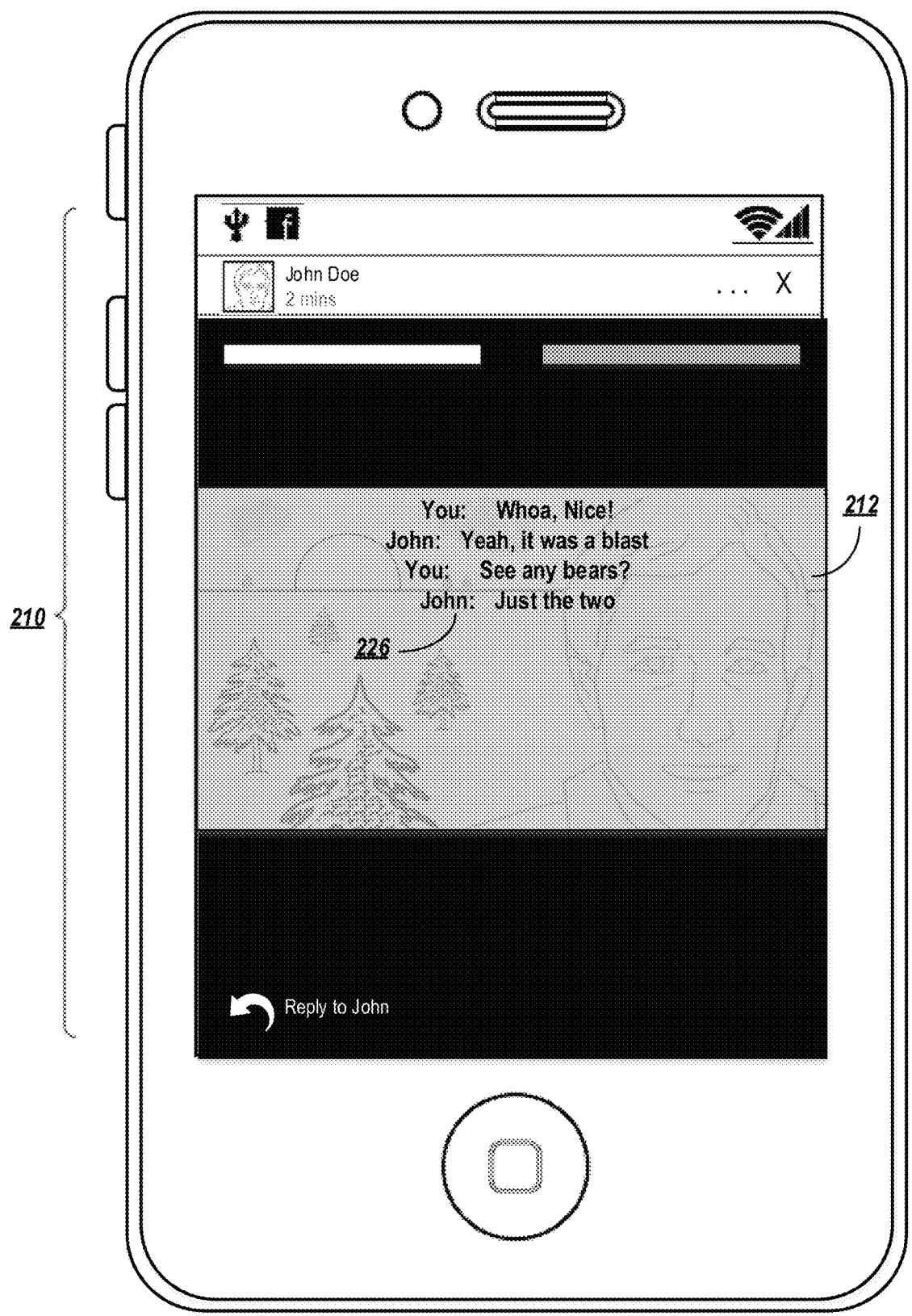
FIG. 2F depicts the visualization interface after additional replies are received.

As additional replies 226 are received, the additional replies may be displayed on the content display 212, as shown in FIG. 2E. Optionally, as more and more replies are displayed, the content display 212 may progressively darken. For example, the content display 212 in FIG. 2E, with two replies 226, is darker than the content display 212 in FIG. 2D, with only one reply. When a relatively large number of replies 226 are received, as shown for example in FIG. 2F, the content display 212 may be heavily darkened or the content may disappear altogether.

Figure 2G:
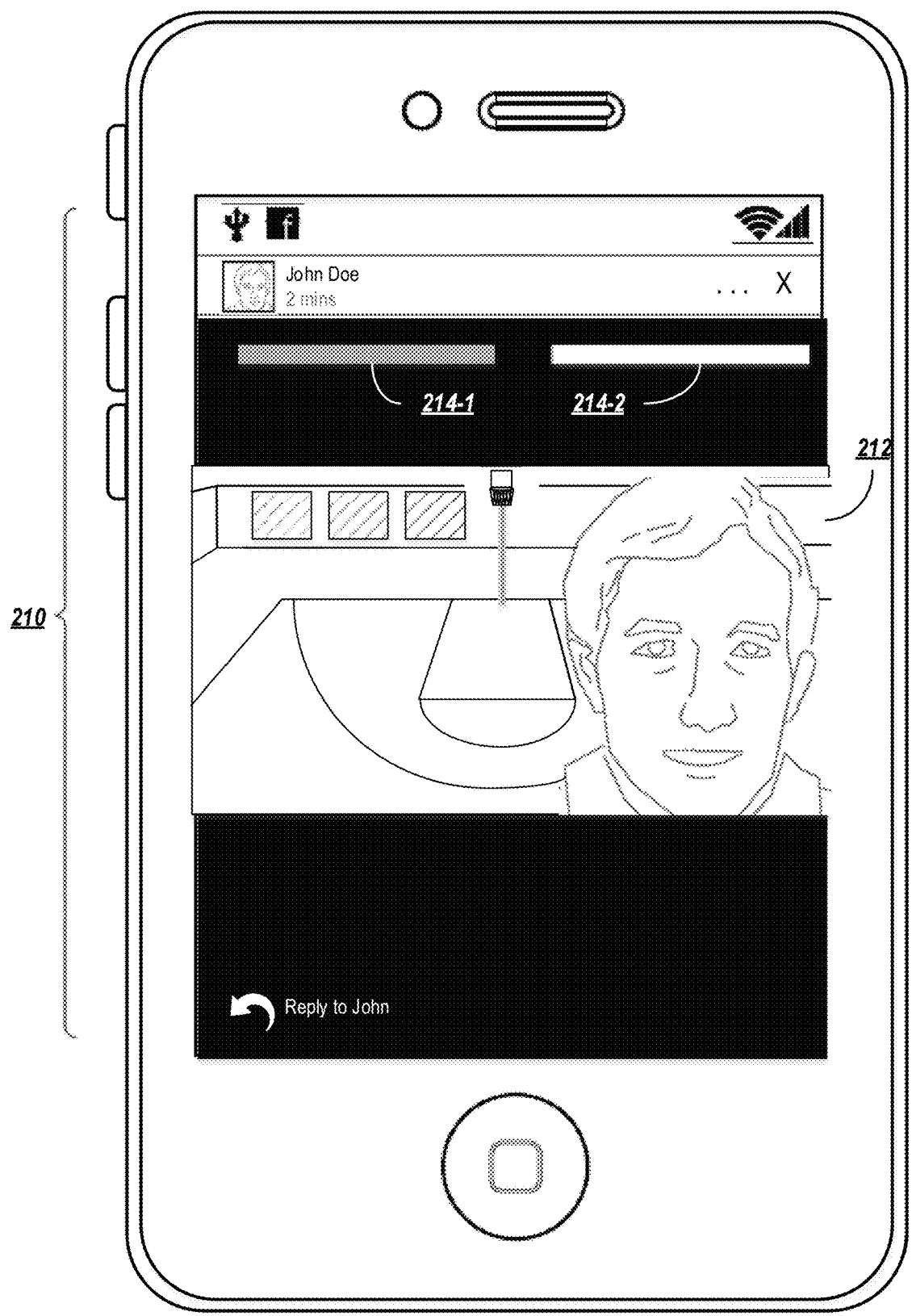
FIG. 2G depicts the visualization interface when advancing to additional content

The user may interact with the visualization interface 210 to move forward or backward in the list of content available from a particular user. For example, if the visualization interface 210 is displayed on a touch-sensitive display, then the display may register a haptic interaction, such as a tap in a particular area of the display or a swipe in a particular direction, to move forward or backward in the list of content. As the content is advanced, new content or previous content may be displayed in the content display 212, as shown in FIG. 2G. When the content is advanced, the content indicator bars 214-$i$ may be updated to reflect the current location in the list of available content.

When the user advances past the last content in the list of available content for a given user, the system may advance to the first available content for the next user. Alternatively, the system may revert to the inbox interface 200. The system may also revert to the inbox interface 200 upon receiving an instruction to exit the visualization interface 210 (e.g., by selecting the "X" icon in the visualization interface 210).

Figure 2H:
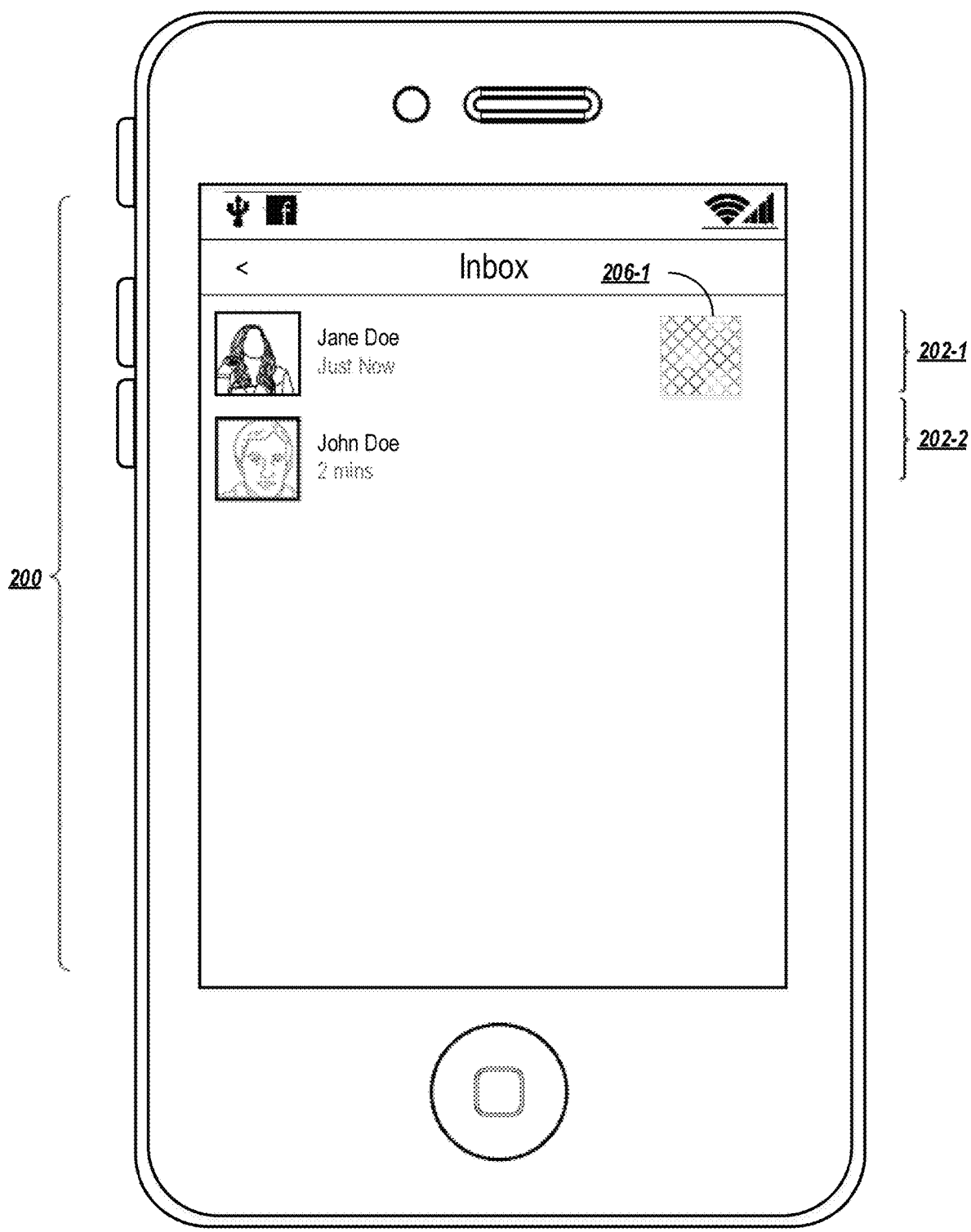
FIG. 2H depicts the inbox interface after viewing content.

After having viewed available content from a particular user, the inbox interface 200 may be updated to, e.g., decrement the content amount indicator 208. Furthermore, if no content remains available for a given user account, the content preview for that account may be removed. For instance, in FIG. 2H, the user has not viewed all available content for the first account element 202-1, and thus a content preview 206-1 remains available for the first account element 202-1. On the other hand, the user has exhausted the available content for the second account element 202-2, and thus the content preview 206-2 has been removed.

Figure 2I:
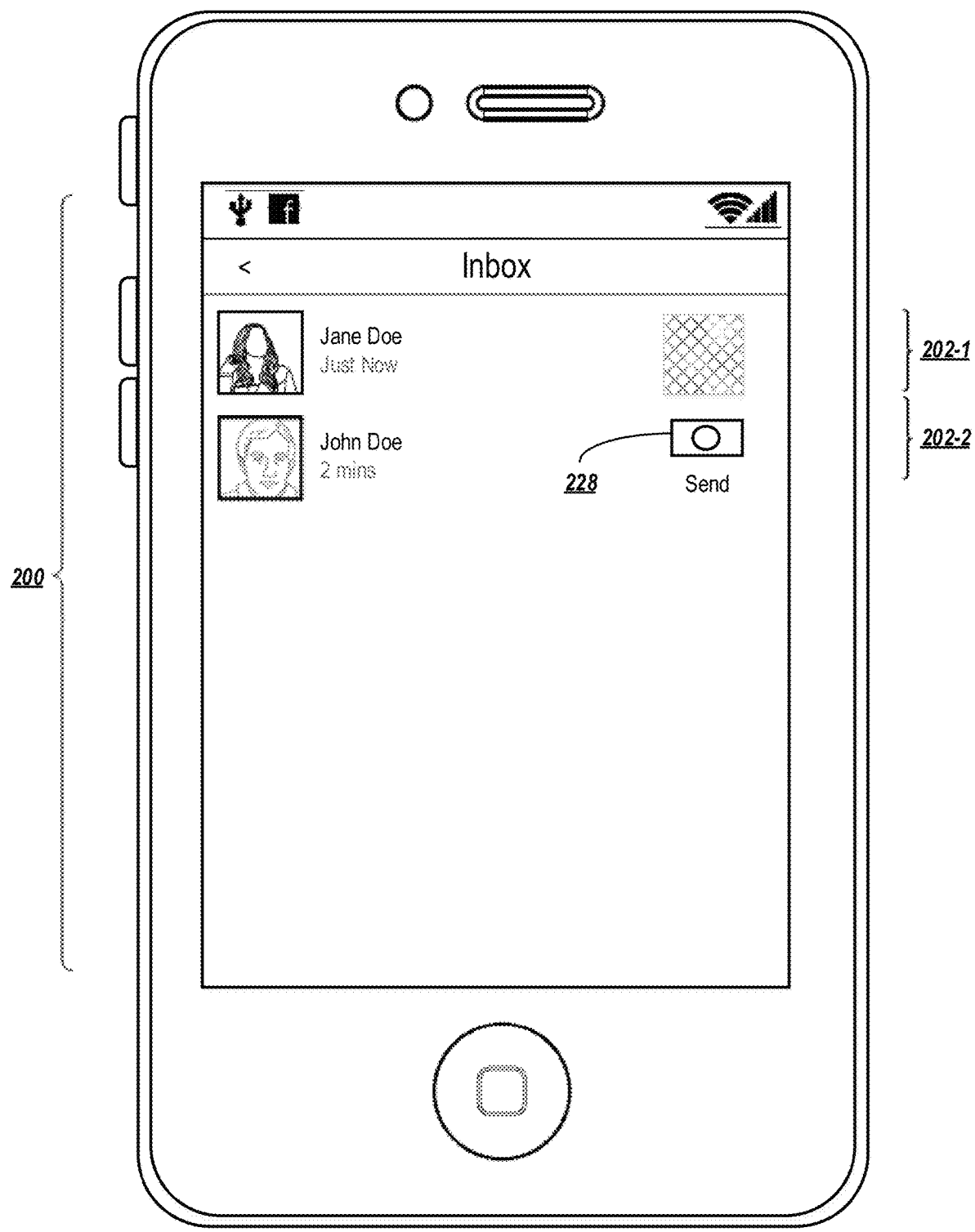
FIG. 2I depicts an alternative inbox interface after viewing content.
Figure 2J:
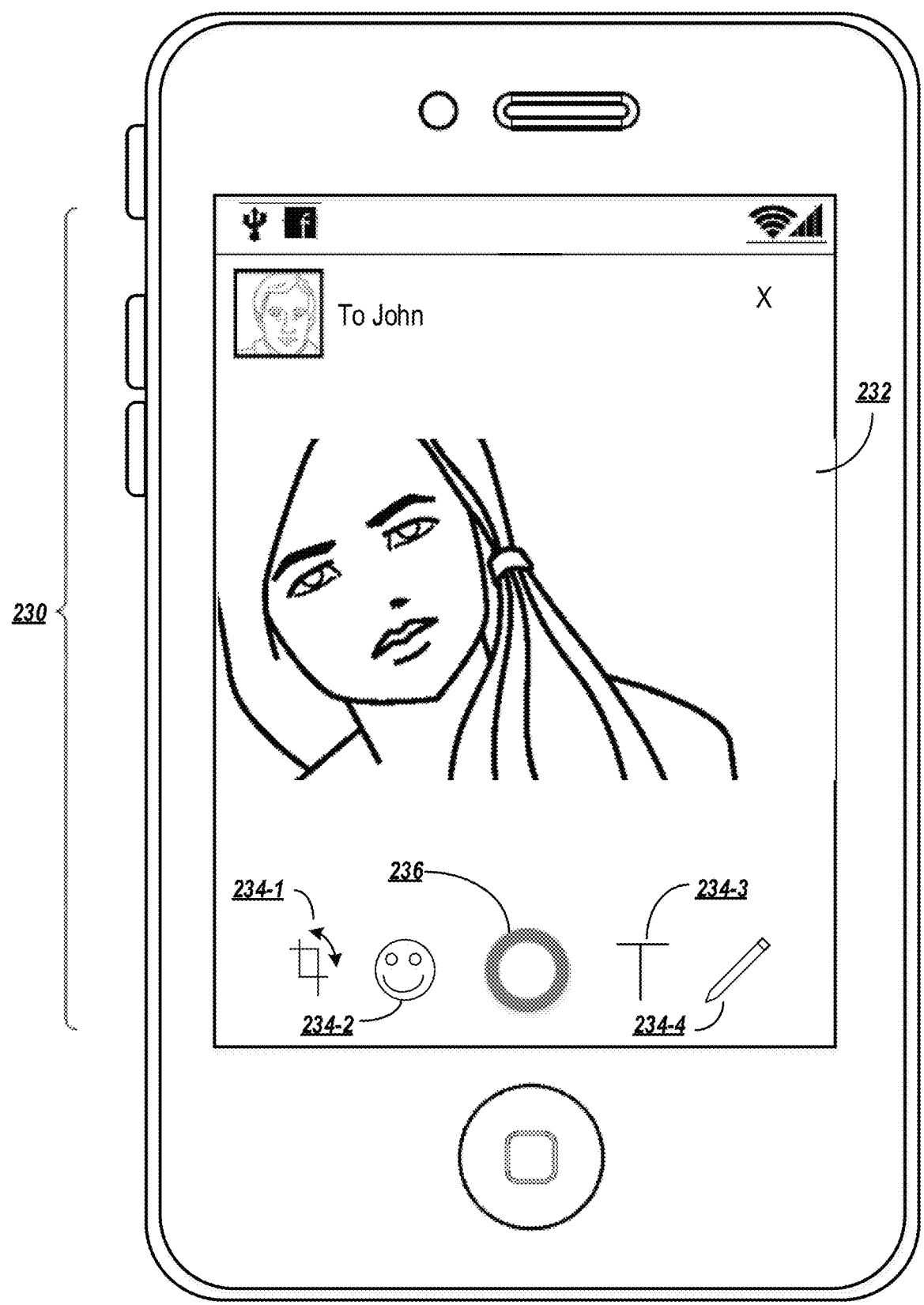
FIG. 2J depicts an exemplary content capture interface.

Instead of displaying nothing in the space available for the content preview 206-2, the system may display a content generation icon 228, which allows the user to generate content to be exchanged with the user associated with the account element (202-2, as depicted in FIG. 2I). Selecting the content generation icon 228 may cause a content capture interface 230 to be displayed, as shown in FIG. 2J.

The content capture interface 230 may present an interface allowing a user to generate or capture content, such as images, a video, an audio recording, etc. The content capture interface 230 may include a preview window 232 displaying a preview of the content to be captured (e.g., a camera preview window). The content capture interface 230 may further include editing icons 234-$i$, allowing content in the preview window 232 to be manipulated, supplemented, etc. A capture icon 236 may cause the content in the preview window to be captured for manipulation through the editing icons 234-$i$ and/or to be transmitted as new content.

Figure 2K:
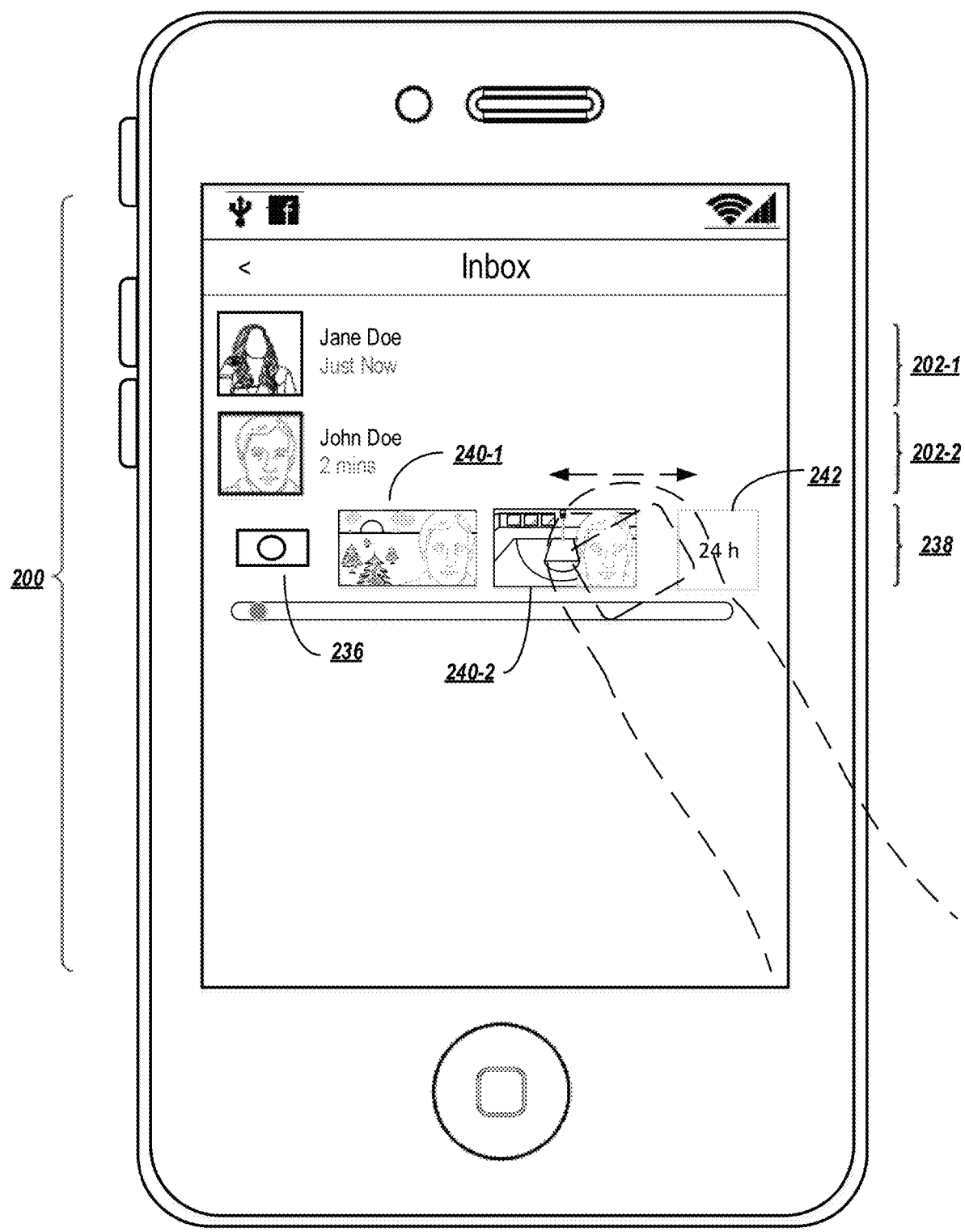
FIG. 2K depicts an alternative inbox interface for displaying multiple content items.

As an alternative to the previously-depicted inbox interfaces 200, multiple content items and/or the capture icon 236 may be displayed in a drawer 238 related to an account element 202-$i$, as shown in FIG. 2K. The drawer 238 may further include content item previews 240-$i$ for each available content item. Permanently available content items may be associated with a thumbnail or reduced-size view, whereas ephemeral content items may be associated with a distorted view. Optionally, content items older than a predetermined amount of time (e.g., 24 hours) may be replaced with a timestamped view 242.

Next, exemplary data structures and logic for organizing and processing content in conversation threads are described with reference to FIGS. 3-4B.

Exemplary Structures and Techniques for Conversation Threads and Content

Figure 3:
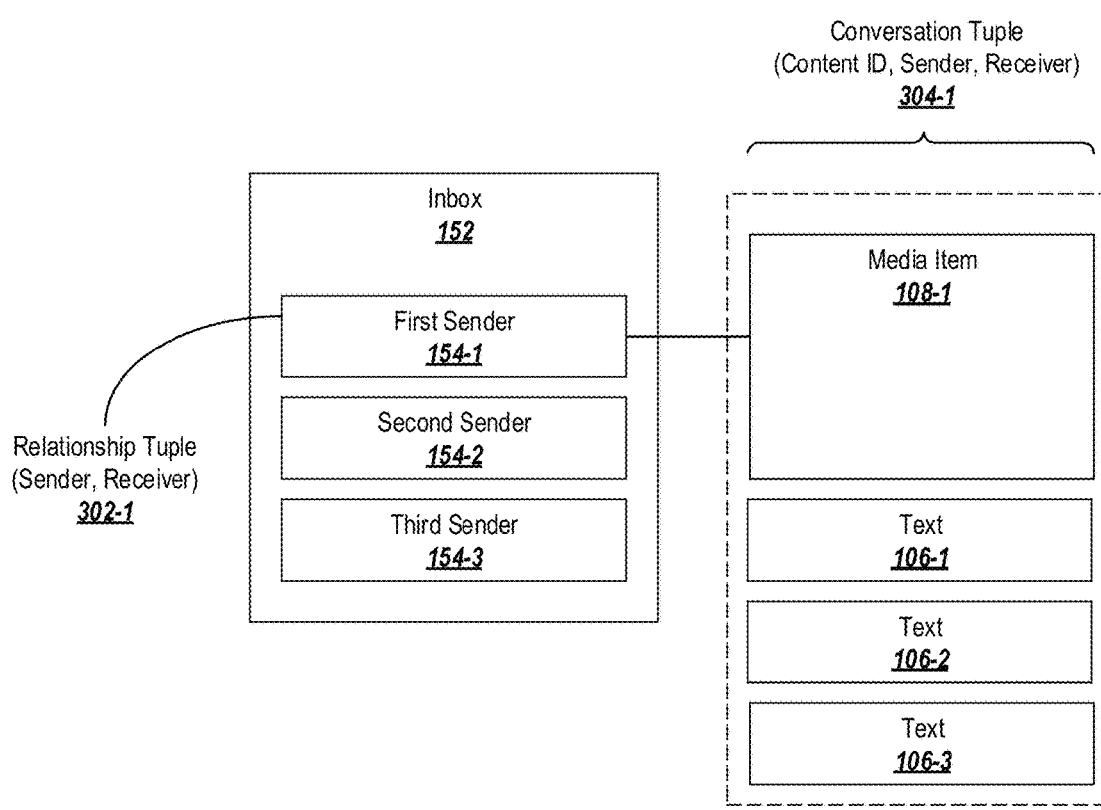
FIG. 3 depicts exemplary data structures for organizing conversation content based on the hierarchical structure depicted in FIG. 2B.

FIG. 3 depicts exemplary data structures for organizing conversation content based on the hierarchical structure depicted in FIG. 1B. As previously noted, media items 108-$i$ may serve as primitives or organizing features of the model. Content may be aggregated in two hierarchical tiers: first, on a per-sender basis, and second on a per-content basis.

In order to organize the content for use with this model, each sender/receiver pair may be associated with a relationship tuple 302-$i$ of the form (Sender, Receiver). The relationship tuple 302-$i$ conceptually represents a "bucket" into which conversations based on media items 108-$i$ may be placed. The conversations may be assigned to a relationship tuple through the use of a conversation tuple 304-$i$ of the form (Content ID, Sender, Receiver). The content ID may be a unique identifier assigned to a particular media item 108-$i$. A conversation may be considered to be associated with a relationship tuple 302-$i$ when the Sender and Receiver of the conversation tuple 304-$i$ matches the Sender and Receiver relationship tuple 302-$i$.

Because the conversation tuple 304-$i$ includes the Content ID, ephemerality may be implemented for the associated media item 108-$i$ by storing a single copy of the media item 108-$i$, e.g., at a server, to provide access to each (Sender, Recipient) pair that is authorized to retrieve the media item 108-$i$. While a given recipient is authorized to view the media item 108-$i$, a corresponding conversation tuple 304-$i$ may be associated with a bucket corresponding to the relationship tuple including the (Sender, Recipient) pair. As long as the conversation tuple 304-$i$ is provided in the relationship tuple 302-$i$'s bucket, the recipient's client may retrieve the media item 108-$i$ from the server. When the recipient is no longer authorized to view the media item, the conversation tuple 304-$i$ having the content ID for the content 108-$i$ may be removed from the relationship tuple 302-$i$'s bucket, thereby removing access to the media item 108-$i$ from the recipient. The media item 108-$i$ may continue to be stored at the server for access by other users that remain able to access the media item. Thus, ephemerality rules may be applied to the conversation tuple to remove access to the media item 108-$i$.

Textual replies 106-$i$ may also be associated with the conversation tuple 304-$i$. According to some embodiments, removing access to the conversation tuple 304-$i$ may remove access to the media item 108-$i$ and all replies 106-$i$ to the media item 108-$i$. In other embodiments, the conversation tuple 304-$i$ at the server may be redirected only to the textual replies 106-*i* after the media item expires (e.g., associating the replies with a different content ID, or flagging the conversation tuple as expired and thus unable to be used to retrieve the content).

Figure 4A:
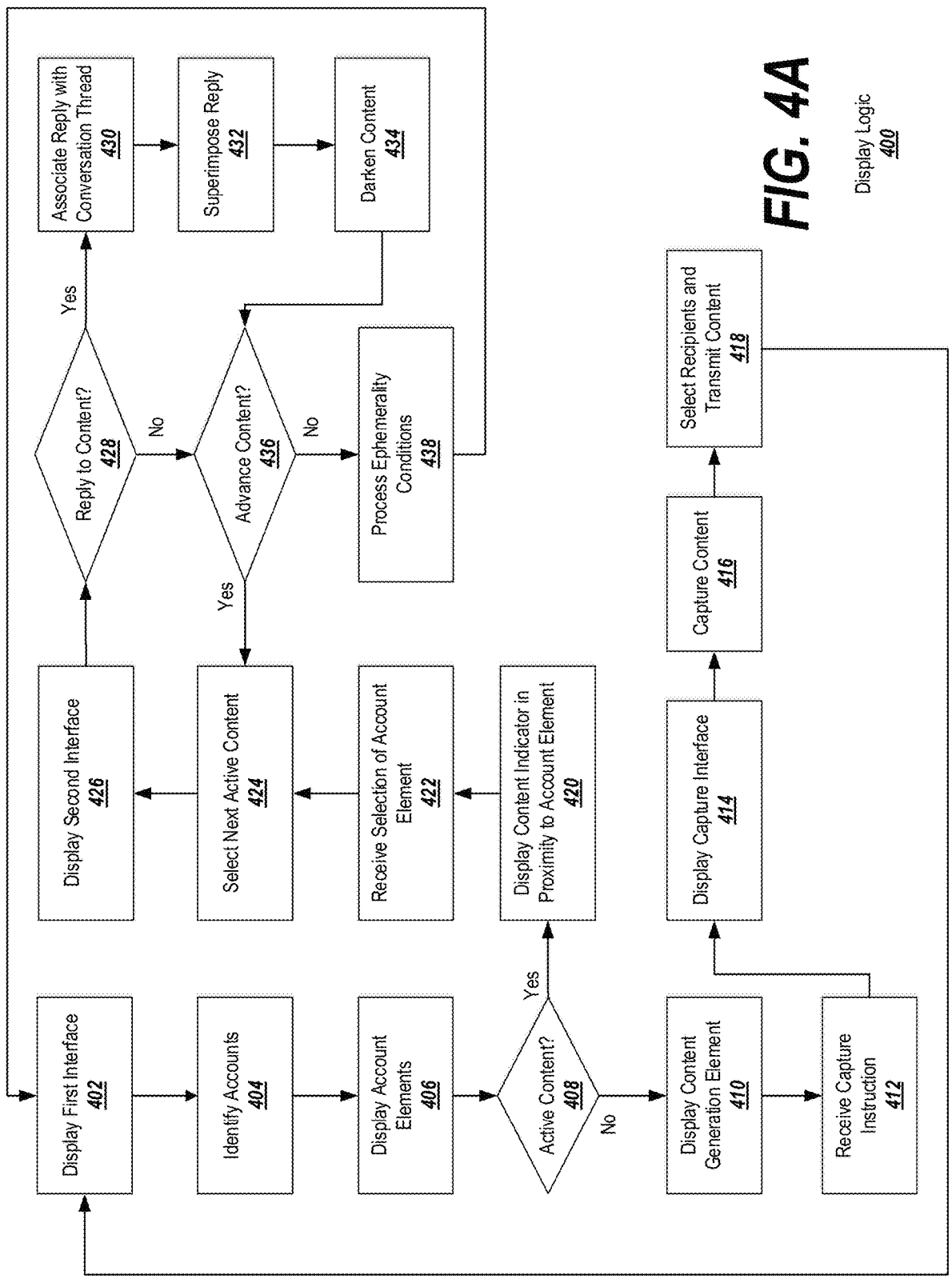
FIG. 4A is a flowchart depicting exemplary logic for processing and displaying conversation content.
Figure 4B:
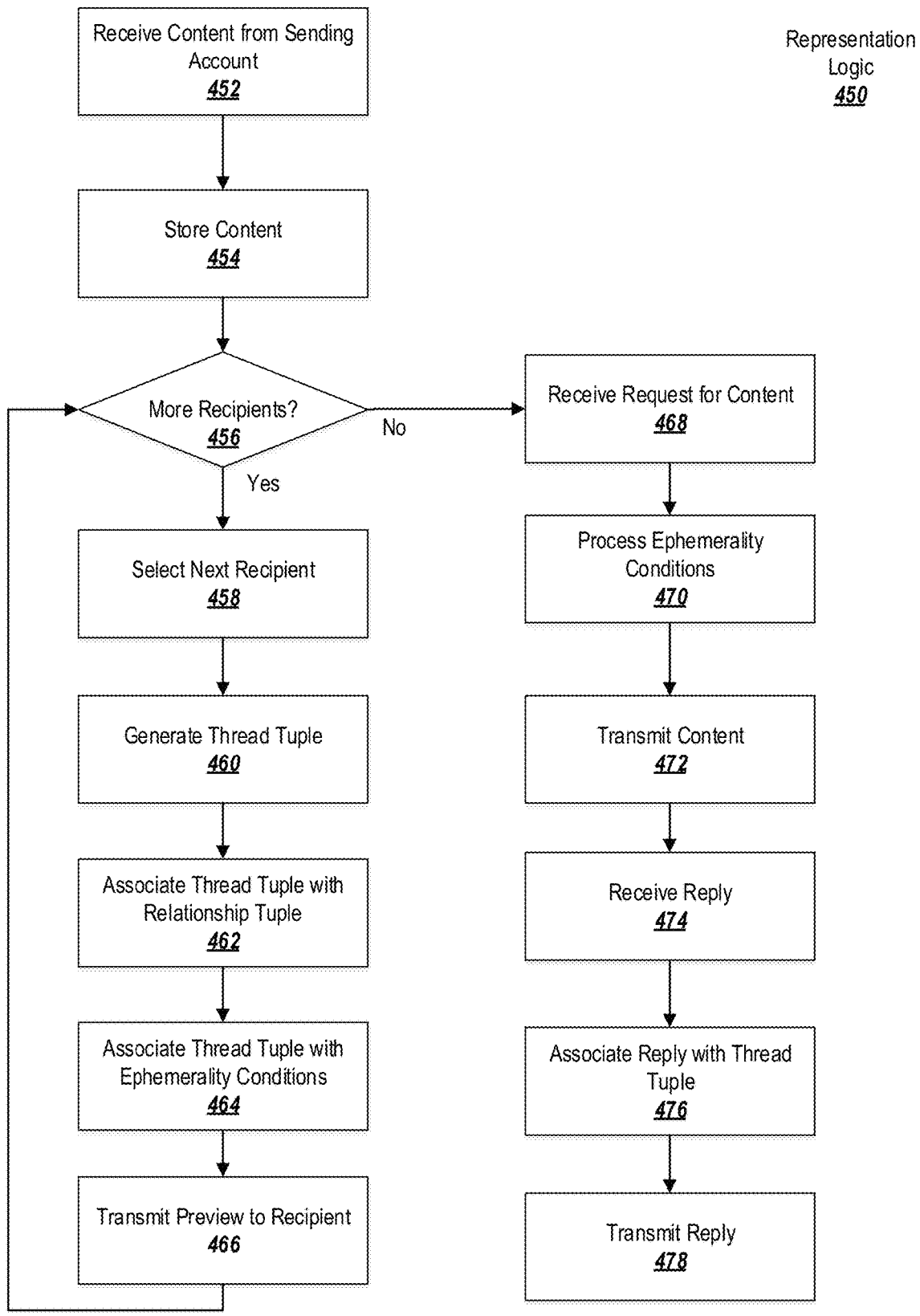
FIG. 4B is a flowchart depicting exemplary logic for representing conversation content in a hierarchical structure.

FIG. 4A is a flowchart depicting exemplary logic 400 for processing and displaying conversation content. The logic 400 may be performed by a system, such as a client system running an application associated with a communications service. Alternatively or in addition, some or all of the logic may be implemented remotely (e.g., at a server associated with the communications service).

At block 402, the system may receive an instruction to display a first interface of the communications application. The first interface may correspond to an inbox interface, as depicted for example in FIG. 2A. The instruction may be received, for instance, upon loading the application, or upon receiving a request to navigate to the inbox interface from within the application. In response receiving the instruction, the system may display the inbox interface and begin to propagate the inbox interface with content, such as the above-described account elements.

To that end, at block 404, the system may identify accounts for which account elements may be displayed. The system may select accounts from an address book or contacts list associated with the user of the application on the communications service. For example, the system may select accounts that have recently (within a predetermined period of time) shared content, or to which content has recently been shared by the current user. Alternatively or in addition, the system may select accounts that are popular with the current user, such as accounts that have been regularly reviewed by the user or from which the user has regularly received shared content (e.g., over a predetermined period of time). In some embodiments, the selected accounts may include accounts that are popular with the user's contacts (e.g., accounts that have generated the most engagement from the user's contacts, such as replies to content or other indications of affinity). Accounts may also be selected for display based on other metrics, as appropriate.

At block 406, the system may display account elements in the first interface associated with the accounts selected at block 404. The account elements may include account information for identifying the account to the current user. The account elements may further include information such as a preview of available content, an indicator of how much shared content is available from the account, an indication of when the account last shared content, etc.

At block 408, the system may determine, for each account element, whether any active content is associated with the account element. For example, active content may include non-ephemeral content (e.g., permanent content that remains associated with the account until deleted by the sender or the recipient) or ephemeral content that has not yet expired. The system may query a server for a number of available content items from the accounts identified at block 404.

If the determination at block 408 is "no" (i.e., no active content is associated with a given account element), then at block 410 the system may optionally display a content generation element in association with any account elements for which active content is not available. The content generation element may allow the current user to generate content to be shared with the recipient associated with the account element and/or other users.

At block 412, the system may receive a capture instruction, such as a selection of the content generation element. A capture instruction may also be received, e.g., from a menu item in the first interface or from other locations inside or outside the communications application. In response to receiving the capture instruction, at block 414 the system may display a capture interface for capturing content, such as the interface 230 depicted in FIG. 2J. At block 416, the system may receive an instruction to capture or otherwise generate content through the capture interface. In response, the content may be captured and/or edited.

At block 418, the system may present an interface allowing the user to share the content with additional recipients. If the capture interface was entered by selecting a content generation element associated with a particular account element, then the user associated with the account element may be preselected to receive the content (although the user may be permitted to de-select this user). Other users or groups of users may be selectable in the sharing interface.

Once recipients for the content have been selected, the system may transmit the content to the recipients. For example, the system may forward a copy of the content to a server associated with the communications service, along with a list of intended recipients. The server may fan out the content to the recipients, as applicable. Processing may then return to block 402, and the first interface (e.g., the inbox interface) may be displayed.

Returning to block 408, if the determination at this block is "yes" (i.e. active content is associated with a given account element), then at block 420 the system may display a content indicator in proximity to the account element. The content indicator may indicate a number of available content items associated with the account element. For example, the content indicator may be a content amount indicator as previously described.

Optionally, the system may display a preview of the next available content item from the user associated with the account element. The next available content item may be selected based on ordering metric(s), as discussed in connection with block 424, below. If the next available content item is a permanent content item, then a thumbnail version or portion of the content item may be displayed in the preview. If the next available content item is an ephemeral content item, then the preview may include a distorted (e.g., blurred, pixelated, etc.) version of the content item or other placeholder.

At block 422, the system may receive a selection of one of the account elements. For example, the user may select the account element using an input device. If the system includes a touch-based display, the system may register a haptic contact in the area defined by the account element, which may be registered as a selection of the account element.

At block 424, the system may select the next active content available from the account associated with the account element selected at block 422. If only one content item is available, then the single available content item may be selected. If multiple content items are available, then the content items may be ordered based on one or more ordering metrics (e.g., most recently generated, popularity, most recently replied-to, most replies, etc.). The content item having the next-highest rank based on the ordering metric(s) may be selected at block 424.

At block 426, the system may display a second interface for rendering the content, such as the visualization interface 210 depicted in FIG. 2B. The second interface may include a content display for displaying the content.

Displaying the second interface may include displaying replies to the content. The replies may be displayed on the content, or in proximity to the content. Alternatively or in addition, the replies may be displayed in a separate interface accessible from the second interface.

The content in the second interface may be progressively darkened based on the number of replies associated with the content. For example, the content may remain undarkened for a predetermined number of replies (e.g., 0-5 replies). After the predetermined number of replies is reached, the content may be darkened based on the number of replies received over the threshold. An upper threshold (e.g., 10-20 replies) may also be defined, at which point the content may be fully darkened. The content may be darkened according to a defined relationship (e.g., linearly, exponentially, etc.) between the predetermined number of replies and the upper threshold.

At block 428, the system may determine whether a reply to the content has been received at the system (e.g., the user may enter a reply in to the reply interface as depicted in FIG. 2C). If the determination at block 428 is "yes" (i.e., a reply has been received), then at block 430 the system may associate the reply with a conversation thread including the content item. For example, the system may flag the reply with metadata including a conversation tuple based on a content ID of the content item.

If the reply is or includes non-textual content (e.g., an image or video), then optionally the reply may be associated with a new conversation (e.g., the new content may be provided with a newly generated content ID and associated with a conversation tuple based on the new content ID).

At block 432, the system may superimpose the reply on the content display in the second interface. At block 434, the system may optionally darken the content in the content display based on the above-described factors.

Processing may then proceed to block 436. Processing may also proceed to block 436 is the determination at block 428 is "no" (i.e., a reply has not been received).

At block 436, the system may determine whether to advance the content. For example, if additional content is associated with the selected user account and the system receives an instruction to advance to the next content (or to return to previous content), then the determination at block 436 may be "yes." In some embodiments, the system may automatically advance to the next content under certain conditions (e.g., the content may be associated with a timer that begins when the second interface is displayed at block 426, and may automatically advance when the timer expires). Alternatively, the system may receive an instruction to exit the second interface without advancing the content (e.g., to return to the first interface), in which case the determination at block 436 may be "no."

If the determination at block 436 is "yes," then processing may return to block 424. If the instruction was to advance the content, then the next available content may be retrieved. If the instruction was to return to previously viewed content, then the previous content may be retrieved.

If the determination at block 436 is "no," then processing may proceed to block 438. At block 438, the system may process any ephemerality conditions for the content. For example, if the content is associated with an ephemerality condition that defines a number of views allocated to the content before the content expires, then a counter associated with the number of content views may be incremented. If the content is associated with an ephemerality condition that defines an amount of time that the content remains active after initially viewed, then a timer may be started, or the current time may be flagged, or an expiration time may be calculated based on the current time in order to determine when the content will expire. Optionally, if a reply was received at block 428, the ephemerality rules may be suspended or otherwise modified in order to allow the user to continue to view the content as a further conversation takes place in connection with the content item. Upon evaluating the ephemerality conditions, the content may be flagged as inactive, locally or at a remote server, if the conditions indicate that the content is no longer active for the current user. Upon receiving an indication that the content is no longer active, the server may, for example, remove the thread tuple corresponding to the content and the sender/receiver pair from the bucket defined by the relationship tuple corresponding to the sender/receiver pair. Upon exiting the visualization interface, the content may optionally be deleted from the local device if the ephemerality conditions indicate that the content has expired (or as a matter of course, in order to force the system to retrieve the content from a server each time the content is to be viewed, thereby allowing the server to enforce ephemerality). Processing may then return to block 402 and the first interface may be displayed.

Next, exemplary logic 450 for representing conversation content in a hierarchical structure is described in connection with the flowchart depicted in FIG. 4B. The logic 450 may be performed by a system, such as a server associated with a communications service. Some or all of the logic may be implemented remotely, such as at a client device running an application of the communications service.

At block 452, the system may receive content from a sending account. The content may be sent with a list of one or more recipients for the content. At block 454, the content may be stored locally at the system, or remotely in a location accessible to the system.

At block 456, the system may determine if additional recipients for the content remain to be processed (e.g., by consulting the list of recipients received at block 452 and determining whether all such recipients have been processed). If the determination at block 456 is "yes," then processing may proceed to block 458.

At block 458, the system may select the next recipient in the list to be processed. The system may, at block 460, generate a content identifier for the content item received at block 452, and may generate a thread tuple including the content identifier, the sender, and the currently-processed recipient.

At block 462, the system may associate the thread tuple with a relationship tuple including the sender and the currently-processed recipient, if such a tuple already exists. For example, the system may maintain a database or list of conversation buckets defined by the relationship tuples, and the system may consult the database or list to determine if such a relationship tuple already exists. If a relationship tuple does already exist for the sender/user pair, then the thread tuple may be associated with the relationship tuple in the database. If a corresponding relationship tuple does not already exist, then one may be generated.

At block 464, the system may optionally associate the thread tuple with ephemerality conditions. The ephemerality conditions may include, for example, a number of views to live, and/or may include an amount of time to live, after which the content will expire. The ephemerality conditions may be determined based on metadata transmitted with the content or based on default conditions. In some embodiments, the received content may be flagged as permanent, in which case the system may not apply ephemerality conditions (the received content may alternatively be flagged as ephemeral in order to have ephemerality conditions applied).

At block 466, the system may transmit a preview of the content (e.g. a distorted preview), and/or an indication that content is available, to the currently-processed recipient. Processing may then return to block 456 and the system may determine whether additional recipients remain to be processed.

If the determination at block 456 is "no" (i.e., no more recipients remain to be processed), then processing may proceed to block 468. At block 468, the system may receive a request for the content. For example, the request may be received from one of the recipients identified in block 452 and may request the content based on the content ID.

At block 470, the system may process any ephemerality conditions to determine if the request received at block 468 is valid. For example, the request may be invalid if the content is not active for the recipient from whom the request was received. The system may receive an indication that the content is no longer valid from a client at any time. Alternatively or in addition, the system may track ephemerality conditions locally (e.g., starting a timer or incrementing a view counter when the request for the content is received at block 468). Upon receiving an indication that the content is no longer active (or determining that the content is no longer active), the server may, for example, remove the thread tuple corresponding to the content and the sender/receiver pair from the bucket defined by the relationship tuple corresponding to the sender/receiver pair.

Assuming the content remains active and available to the requesting user, at block 472 the system may transmit the content to the requesting user.

At block 474, the system may optionally receive a reply to the content. The reply may be associated with the thread tuple defined by the content identifier for the content transmitted at block 472 and the sender/receiver pair associated with the original sender of the content and the recipient participating in the conversation about the content. At block 478, the reply may be transmitted to the appropriate receiving user. Processing may then terminate.

Communication System Overview

Figure 5A:
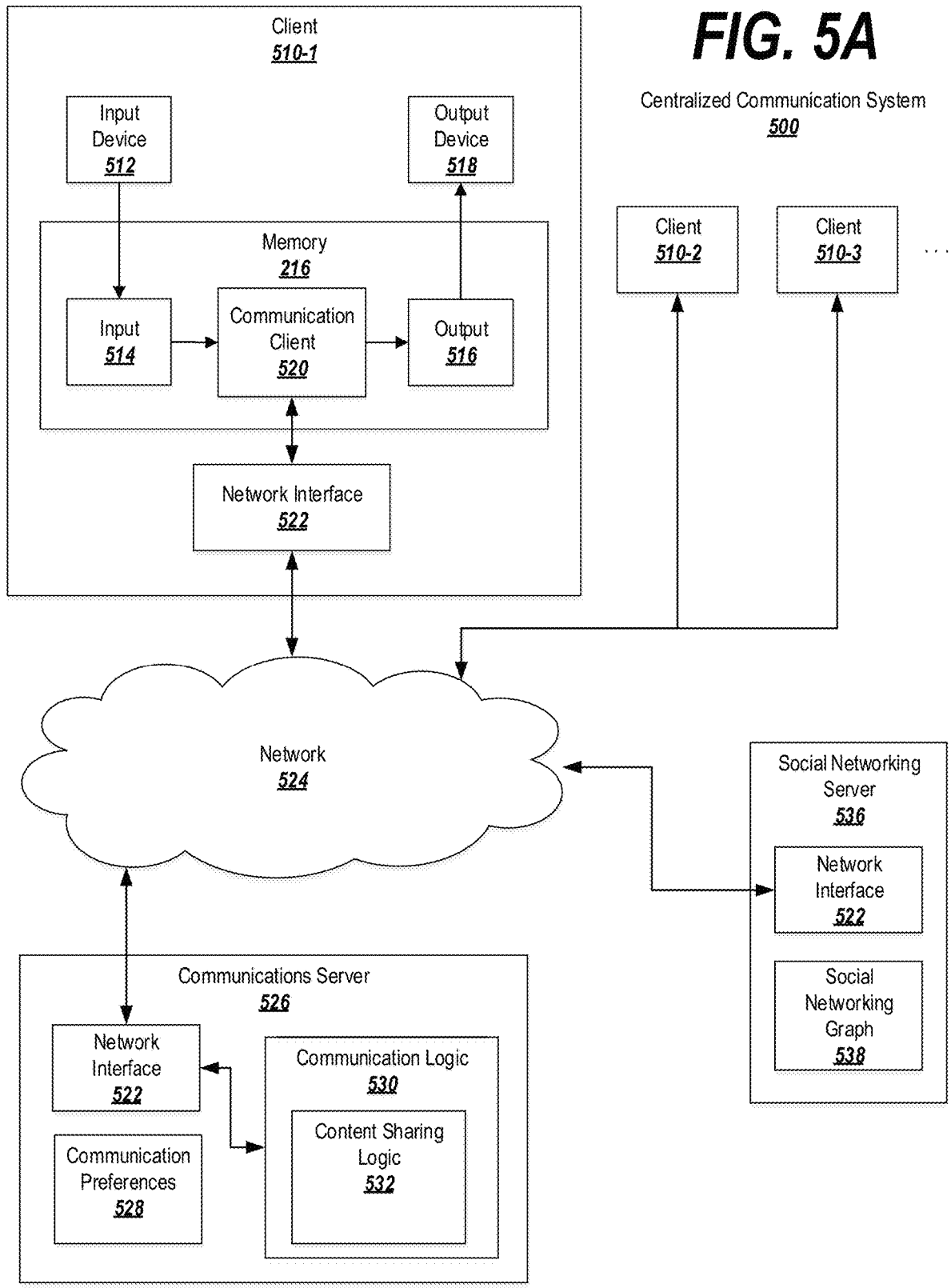
FIG. 5A is a block diagram providing an overview of a system including an exemplary centralized communications service.
Figure 5B:
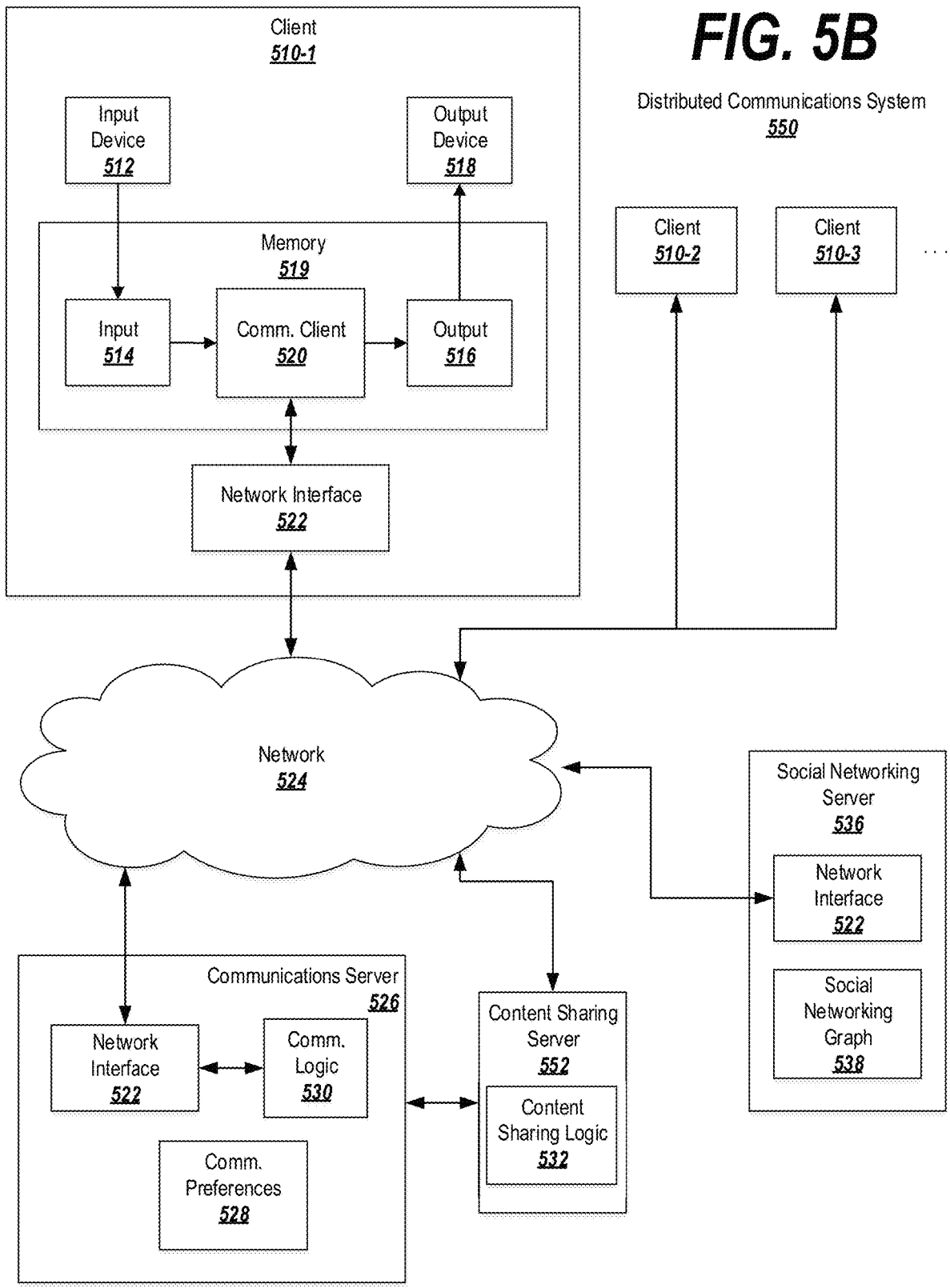
FIG. 5B is a block diagram providing an overview of a system including an exemplary distributed communications service.
Figure 5C:
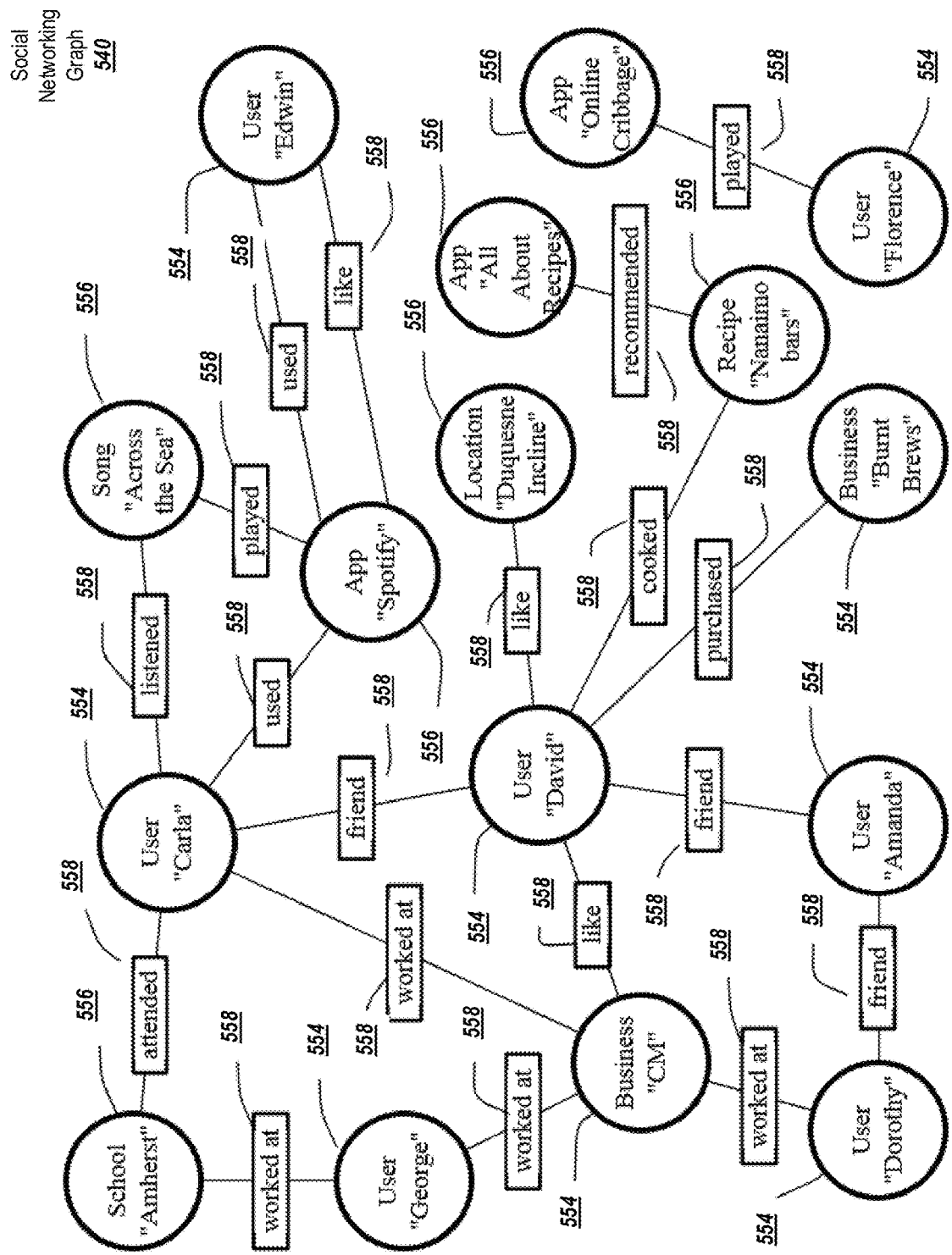
FIG. 5C depicts the social networking graph of FIGS. 8A-8B in more detail.

These examples may be implemented by a service provider system that is provided either locally, at a client device, or remotely (e.g., at a remote server). FIGS. 5A-5C depict various examples of service provider systems, and are discussed in more detail below.

FIG. 5A depicts an exemplary centralized service provider system 500, in which functionality for sharing content is integrated into a communications server. The centralized system 500 may implement some or all of the structure and/or operations of a messaging service in a single computing entity, such as entirely within a single centralized service provider device 526.

The communication system 500 may include a computer-implemented system having software applications that include one or more components. Although the communication system 500 shown in FIG. 5A has a limited number of elements in a certain topology, the communication system 500 may include more or fewer elements in alternate topologies.

A messaging service 500 may be generally arranged to receive, store, and deliver messages. The messaging service 500 may store messages while messaging clients 520, such as may execute on client devices 510, are offline and deliver the messages once the messaging clients are available.

A client device 510 may transmit messages addressed to a recipient user, user account, or other identifier resolving to a receiving client device 510. In exemplary embodiments, each of the client devices 510 and their respective messaging clients 520 are associated with a particular user or users of the messaging service 500. In some embodiments, the client devices 510 may be cellular devices such as smartphones and may be identified to the messaging service 500 based on a phone number associated with each of the client devices 510. In some embodiments, each messaging client may be associated with a user account registered with the messaging service 500. In general, each messaging client may be addressed through various techniques for the reception of messages. While in some embodiments the client devices 510 may be cellular devices, in other embodiments one or more of the client devices 510 may be personal computers, tablet devices, any other form of computing device.

The client 510 may include one or more input devices 512 and one or more output devices 518. The input devices 512 may include, for example, microphones, keyboards, cameras, electronic pens, touch screens, and other devices for receiving inputs including message data, requests, commands, user interface interactions, selections, and other types of input. The output devices 518 may include a speaker, a display device such as a monitor or touch screen, and other devices for presenting an interface to the communication system 500.

The client 510 may include a memory 519, which may be a non-transitory computer readable storage medium, such as one or a combination of a hard drive, solid state drive, flash storage, read only memory, or random access memory. The memory 519 may a representation of an input 514 and/or a representation of an output 516, as well as one or more applications. For example, the memory 519 may store a messaging client 520 and/or a social networking client that allows a user to interact with a social networking service.

The input 514 may be textual, such as in the case where the input device 212 is a keyboard. Alternatively, the input 514 may be an audio recording, such as in the case where the input device 512 is a microphone. Accordingly, the input 514 may be subjected to automatic speech recognition (ASR) logic in order to transform the audio recording to text that is processable by the communication system 500. The ASR logic may be located at the client device 510 (so that the audio recording is processed locally by the client 510 and corresponding text is transmitted to the communications server 526), or may be located remotely at the service provider server 526 (in which case, the audio recording may be transmitted to the service provider server 526 and the service provider server 526 may process the audio into text). Other combinations are also possible—for example, if the input device 512 is a touch pad or electronic pen, the input 514 may be in the form of handwriting, which may be subjected to handwriting or optical character recognition analysis logic in order to transform the input 512 into procesable text.

The client 510 may be provided with a network interface 522 for communicating with a network 524, such as the Internet. The network interface 522 may transmit the input 512 in a format and/or using a protocol compatible with the network 524 and may receive a corresponding output 516 from the network 524.

The network interface 522 may communicate through the network 524 to a communications server 526. The communications server 526 may be operative to coordinate communications between services provided by the service provider.

The communications server 526 may include a network interface 522, communication preferences 528, and communication logic 530. The communication preferences 528 may include one or more privacy settings for one or more users and/or message threads. For example, the communication preferences 528 may include one or more settings, including default settings, for the logic described herein.

The communication logic 530 may include content sharing logic 532 that is operable to process, store, and organize content based on the embodiments described herein.

In some embodiments, messages may be sent peer-to-peer between users without the use of intervening server devices such as may implement the communication service 500. In these embodiments, the communication logic 530, content sharing logic 532, may reside on the client devices 510.

The network interface 522 of the client 510 and/or the service provider server 526 may also be used to communicate through the network 524 with a social networking server 536. The social networking server 536 may include or may interact with a social networking graph 538 that defines connections in a social network. Furthermore, the communications server 526 may connect to the social networking server 536 for various purposes, such as retrieving connection information, messaging history, event details, etc. from the social network.

A user of the client 510 may be an individual (human user), an entity (e.g., an enterprise, business, or third-party application), or a group (e.g., of individuals or entities) that interacts or communicates with or over the social networking server 536. The social-networking server 536 may be a network-addressable computing system hosting an online social network. The social networking server 536 may generate, store, receive, and send social-networking data, such as, for example, user-profile data, concept-profile data, social-graph information, or other suitable data related to the online social network. The social networking server 536 may be accessed by the other components of the network environment either directly or via the network 524.

The social networking server 536 may include an authorization server (or other suitable component(s)) that allows users to opt in to or opt out of having their actions logged by social-networking server 536 or shared with other systems (e.g., third-party systems, such as the communication server 526), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 536 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 538. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 536 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social networking server 536 may send a request to the data store for the object. The request may identify the user associated with the request. The requested data object may only be sent to the user (or a client system 510 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social-networking server 536 or explicit connections of a user to a node, object, entity, brand, or page on social networking server 536. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The centralized embodiment depicted in FIG. 5A may be well-suited to deployment as a new system or as an upgrade to an existing system, because the content sharing logic 532 is incorporated into the communications server 526. In contrast, FIG. 5B depicts an exemplary distributed communication system 550, in which functionality for sharing content is distributed and remotely accessible from the communications server. Examples of a distributed system 550 include a client-server architecture, a 3-tier architecture, an N-tier architecture, a tightly-coupled or clustered architecture, a peer-to-peer architecture, a master-slave architecture, a shared database architecture, and other types of distributed systems.

Many of the components depicted in FIG. 5B are identical to those in FIG. 5A, and a description of these elements is not repeated here for the sake of brevity. The primary difference between the centralized embodiment and the distributed embodiment is the addition of a separate content sharing server 552, which hosts the content sharing logic 532. The content sharing server 552 may be distinct from the communications server 526 but may communicate with the communications server 526, either directly or through the network 524, to provide the functionality of the content sharing logic 532 to the communications server 526.

The embodiment depicted in FIG. 5B may be particularly well suited to allow exemplary embodiments to be deployed alongside existing messaging systems, for example when it is difficult or undesirable to replace an existing messaging server. Additionally, in some cases the communications server 526 may have limited resources (e.g. processing or memory resources) that limit or preclude the addition of the additional pivot functionality. In such situations, the capabilities described herein may still be provided through the separate content sharing server 552.

FIG. 5C illustrates an example of a social networking graph 538. In exemplary embodiments, a social networking service may store one or more social graphs 538 in one or more data stores as a social graph data structure via the social networking service.

The social graph 538 may include multiple nodes, such as user nodes 554 and concept nodes 556. The social graph 228 may furthermore include edges 558 connecting the nodes. The nodes and edges of social graph 228 may be stored as data objects, for example, in a data store (such as a social-graph database). Such a data store may include one or more searchable or queryable indexes of nodes or edges of social graph 228.

The social graph 538 may be accessed by a social-networking server 226, client system 210, third-party system (e.g., the translation server 224), or any other approved system or device for suitable applications.

A user node 554 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 554 corresponding to the user, and store the user node 30 in one or more data stores. Users and user nodes 554 described herein may, where appropriate, refer to registered users and user nodes 554 associated with registered users. In addition or as an alternative, users and user nodes 554 described herein may, where appropriate, refer to users that have not registered with the social-networking system. In particular embodiments, a user node 554 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 554 may be associated with one or more data objects corresponding to information associated with a user. In particular embodiments, a user node 554 may correspond to one or more webpages. A user node 554 may be associated with a unique user identifier for the user in the social-networking system.

In particular embodiments, a concept node 556 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 556 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 556 may be associated with one or more data objects corresponding to information associated with concept node 556. In particular embodiments, a concept node 556 may correspond to one or more webpages.

In particular embodiments, a node in social graph 538 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 556. Profile pages may be viewable by all or a selected subset of other users. As an example and not by way of limitation, a user node 554 may have a corresponding user-profile page in which the corresponding user may add content, make declarations, or otherwise express himself or herself. A business page such as business page 205 may comprise a user-profile page for a commerce entity. As another example and not by way of limitation, a concept node 556 may have a corresponding concept-profile page in which one or more users may add content, make declarations, or express themselves, particularly in relation to the concept corresponding to concept node 556.

In particular embodiments, a concept node 556 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 554 corresponding to the user and a concept node 556 corresponding to the third-party webpage or resource and store edge 558 in one or more data stores.

In particular embodiments, a pair of nodes in social graph 538 may be connected to each other by one or more edges 558. An edge 558 connecting a pair of nodes may represent a relationship between the pair of nodes. In particular embodiments, an edge 558 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 558 connecting the first user's user node 554 to the second user's user node 554 in social graph 538 and store edge 558 as social-graph information in one or more data stores. In the example of FIG. 5C, social graph 538 includes an edge 558 indicating a friend relation between user nodes 554 of user "Amanda" and user "Dorothy." Although this disclosure describes or illustrates particular edges 558 with particular attributes connecting particular user nodes 554, this disclosure contemplates any suitable edges 558 with any suitable attributes connecting user nodes 554. As an example and not by way of limitation, an edge 558 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 538 by one or more edges 558.

In particular embodiments, an edge 558 between a user node 554 and a concept node 556 may represent a particular action or activity performed by a user associated with user node 554 toward a concept associated with a concept node 556. As an example and not by way of limitation, as illustrated in FIG. 5C, a user may "like," "attended," "played," "listened," "cooked," "worked at," or "watched" a concept, each of which may correspond to a edge type or subtype. A concept-profile page corresponding to a concept node 556 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTTY, which is an online music application). In this case, the social-networking system may create a "listened" edge 558 and a "used" edge (as illustrated in FIG. 5C) between user nodes 554 corresponding to the user and concept nodes 556 corresponding to the song and application to indicate that the user listened to the song and used the application. Moreover, the social-networking system may create a "played" edge 558 (as illustrated in FIG. 5C) between concept nodes 556 corresponding to the song and the application to indicate that the particular song was played by the particular application. In this case, "played" edge 558 corresponds to an action performed by an external application (SPOTIFY) on an external audio file (the song "Across the Sea"). Although this disclosure describes particular edges 558 with particular attributes connecting user nodes 554 and concept nodes 556, this disclosure contemplates any suitable edges 558 with any suitable attributes connecting user nodes 554 and concept nodes 556. Moreover, although this disclosure describes edges between a user node 554 and a concept node 556 representing a single relationship, this disclosure contemplates edges between a user node 554 and a concept node 556 representing one or more relationships. As an example and not by way of limitation, an edge 558 may represent both that a user likes and has used at a particular concept. Alternatively, another edge 558 may represent each type of relationship (or multiples of a single relationship) between a user node 554 and a concept node 556 (as illustrated in FIG. 5C between user node 554 for user "Edwin" and concept node 556 for "SPOTIFY").

In particular embodiments, the social-networking system may create an edge 558 between a user node 554 and a concept node 556 in social graph 538. As an example and not by way of limitation, a user viewing a concept-profile page (such as, for example, by using a web browser or a special-purpose application hosted by the user's client system) may indicate that he or she likes the concept represented by the concept node 556 by clicking or selecting a "Like" icon, which may cause the user's client system to send to the social-networking system a message indicating the user's liking of the concept associated with the concept-profile page. In response to the message, the social-networking system may create an edge 558 between user node 554 associated with the user and concept node 556, as illustrated by "like" edge 558 between the user and concept node 556. In particular embodiments, the social-networking system may store an edge 558 in one or more data stores. In particular embodiments, an edge 558 may be automatically formed by the social-networking system in response to a particular user action. As an example and not by way of limitation, if a first user uploads a picture, watches a movie, or listens to a song, an edge 558 may be formed between user node 554 corresponding to the first user and concept nodes 556 corresponding to those concepts. Although this disclosure describes forming particular edges 558 in particular manners, this disclosure contemplates forming any suitable edges 558 in any suitable manner.

The social graph 538 may further comprise a plurality of product nodes. Product nodes may represent particular products that may be associated with a particular business. A business may provide a product catalog to a consumer-to-business service and the consumer-to-business service may therefore represent each of the products within the product in the social graph 538 with each product being in a distinct product node. A product node may comprise information relating to the product, such as pricing information, descriptive information, manufacturer information, availability information, and other relevant information. For example, each of the items on a menu for a restaurant may be represented within the social graph 538 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 538. The information for a product node may be manipulated by the social-networking system as a product object that encapsulates information regarding the referenced product.

As such, the social graph 538 may be used to infer shared interests, shared experiences, or other shared or common attributes of two or more users of a social-networking system. For instance, two or more users each having an edge to a common business, product, media item, institution, or other entity represented in the social graph 538 may indicate a shared relationship with that entity, which may be used to suggest customization of a use of a social-networking system, including a messaging system, for one or more users.

The embodiments described above may be performed by a messaging architecture, an example of which is next described with reference to FIG. 6.

Messaging Architecture

Figure 6:
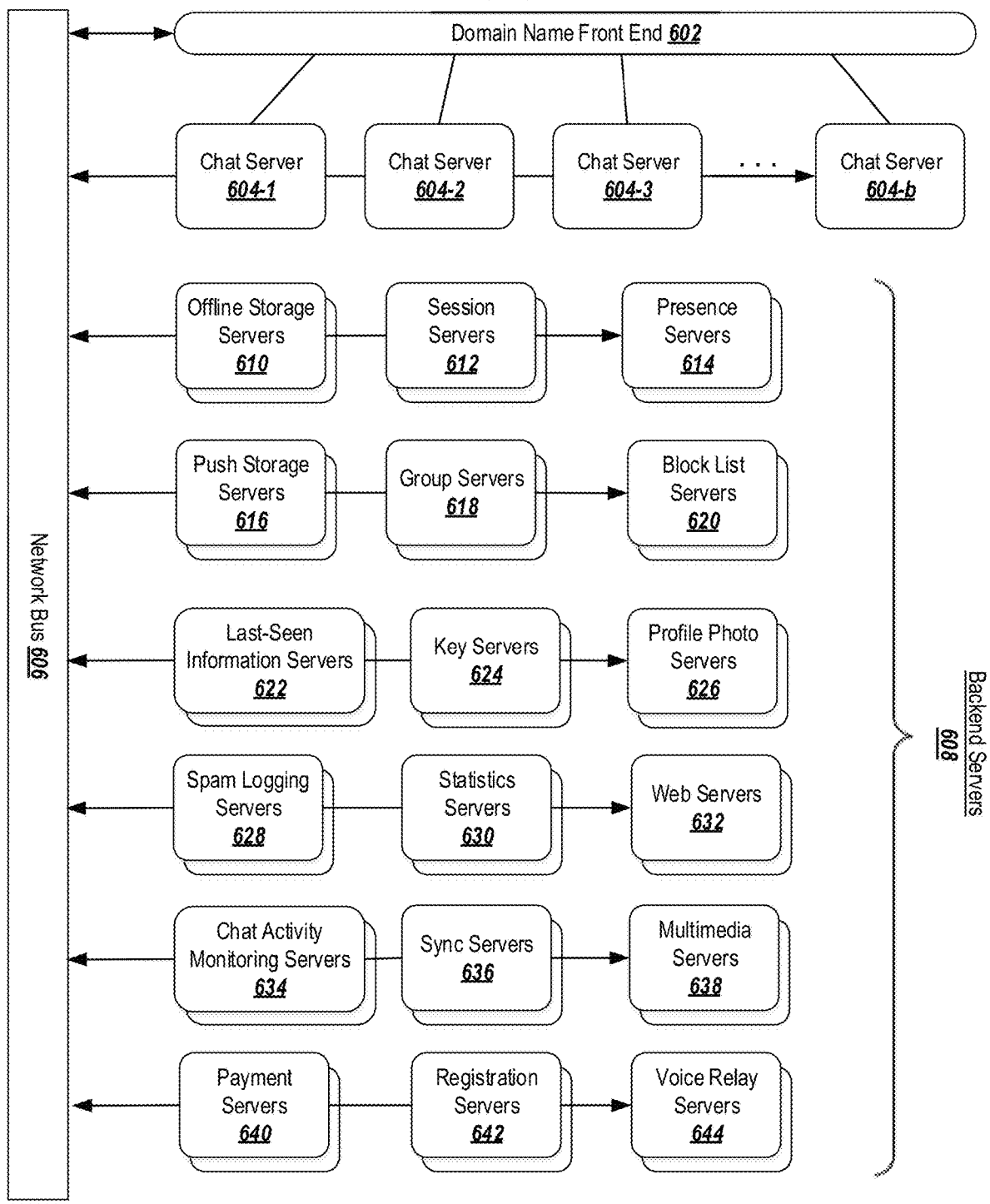
FIG. 6 is a block diagram depicting an example of a system for a messaging service.

FIG. 6 illustrates an embodiment of a plurality of servers implementing various functions of a messaging service 600. It will be appreciated that different distributions of work and functions may be used in various embodiments of a messaging service 600.

The messaging service 600 may comprise a domain name front end 602. The domain name front end 602 may be assigned one or more domain names associated with the messaging service 600 in a domain name system (DNS). The domain name front end 602 may receive incoming connections and distribute the connections to servers providing various messaging services.

The messaging service 602 may comprise one or more chat servers 604. The chat servers 604 may comprise front-end servers for receiving and transmitting user-to-user messaging updates such as chat messages. Incoming connections may be assigned to the chat servers 604 by the domain name front end 602 based on workload balancing.

The messaging service 600 may comprise backend servers 608. The backend servers 608 may perform specialized tasks in the support of the chat operations of the front-end chat servers 604. A plurality of different types of backend servers 608 may be used. It will be appreciated that the assignment of types of tasks to different backend serves 608 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 600 may comprise one or more offline storage servers 610. The one or more offline storage servers 610 may store messaging content for currently-offline messaging clients in hold for when the messaging clients reconnect.

The messaging service 600 may comprise one or more sessions servers 612. The one or more session servers 612 may maintain session state of connected messaging clients.

The messaging service 600 may comprise one or more presence servers 614. The one or more presence servers 614 may maintain presence information for the messaging service 600. Presence information may correspond to user-specific information indicating whether or not a given user has an online messaging client and is available for chatting, has an online messaging client but is currently away from it, does not have an online messaging client, and any other presence state.

The messaging service 600 may comprise one or more push storage servers 616. The one or more push storage servers 616 may cache push requests and transmit the push requests to messaging clients. Push requests may be used to wake messaging clients, to notify messaging clients that a messaging update is available, and to otherwise perform server-side-driven interactions with messaging clients.

The messaging service 600 may comprise one or more group servers 618. The one or more group servers 618 may maintain lists of groups, add users to groups, remove users from groups, and perform the reception, caching, and forwarding of group chat messages.

The messaging service 600 may comprise one or more block list servers 620. The one or more block list servers 620 may maintain user-specific block lists, the user-specific incoming-block lists indicating for each user the one or more other users that are forbidden from transmitting messages to that user. Alternatively or additionally, the one or more block list servers 620 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 600 may comprise one or more last seen information servers 622. The one or more last seen information servers 622 may receive, store, and maintain information indicating the last seen location, status, messaging client, and other elements of a user's last seen connection to the messaging service 600.

The messaging service 600 may comprise one or more key servers 624. The one or more key servers may host public keys for public/private key encrypted communication.

The messaging service 600 may comprise one or more profile photo servers 626. The one or more profile photo servers 626 may store and make available for retrieval profile photos for the plurality of users of the messaging service 600.

The messaging service 600 may comprise one or more spam logging servers 628. The one or more spam logging servers 628 may log known and suspected spam (e.g., unwanted messages, particularly those of a promotional nature). The one or more spam logging servers 628 may be operative to analyze messages to determine whether they are spam and to perform punitive measures, in some embodiments, against suspected spammers (users that send spam messages).

The messaging service 600 may comprise one or more statistics servers 630. The one or more statistics servers may compile and store statistics information related to the operation of the messaging service 600 and the behavior of the users of the messaging service 600.

The messaging service 600 may comprise one or more web servers 632. The one or more web servers 632 may engage in hypertext transport protocol (HTTP) and hypertext transport protocol secure (HTTPS) connections with web browsers.

The messaging service 600 may comprise one or more chat activity monitoring servers 634. The one or more chat activity monitoring servers 634 may monitor the chats of users to determine unauthorized or discouraged behavior by the users of the messaging service 600. The one or more chat activity monitoring servers 634 may work in cooperation with the spam logging servers 628 and block list servers 620, with the one or more chat activity monitoring servers 634 identifying spam or other discouraged behavior and providing spam information to the spam logging servers 628 and blocking information, where appropriate to the block list servers 620.

The messaging service 600 may comprise one or more sync servers 636. The one or more sync servers 636 may sync the communication system 500 with contact information from a messaging client, such as an address book on a mobile phone, to determine contacts for a user in the messaging service 600.

The messaging service 600 may comprise one or more multimedia servers 638. The one or more multimedia servers may store multimedia (e.g., images, video, audio) in transit between messaging clients, multimedia cached for offline endpoints, and may perform transcoding of multimedia.

The messaging service 600 may comprise one or more payment servers 640. The one or more payment servers 640 may process payments from users. The one or more payment servers 640 may connect to external third-party servers for the performance of payments.

The messaging service 600 may comprise one or more registration servers 642. The one or more registration servers 642 may register new users of the messaging service 600.

The messaging service 600 may comprise one or more voice relay servers 644. The one or more voice relay servers 644 may relay voice-over-internet-protocol (VoIP) voice communication between messaging clients for the performance of VoIP calls.

Figure 7:
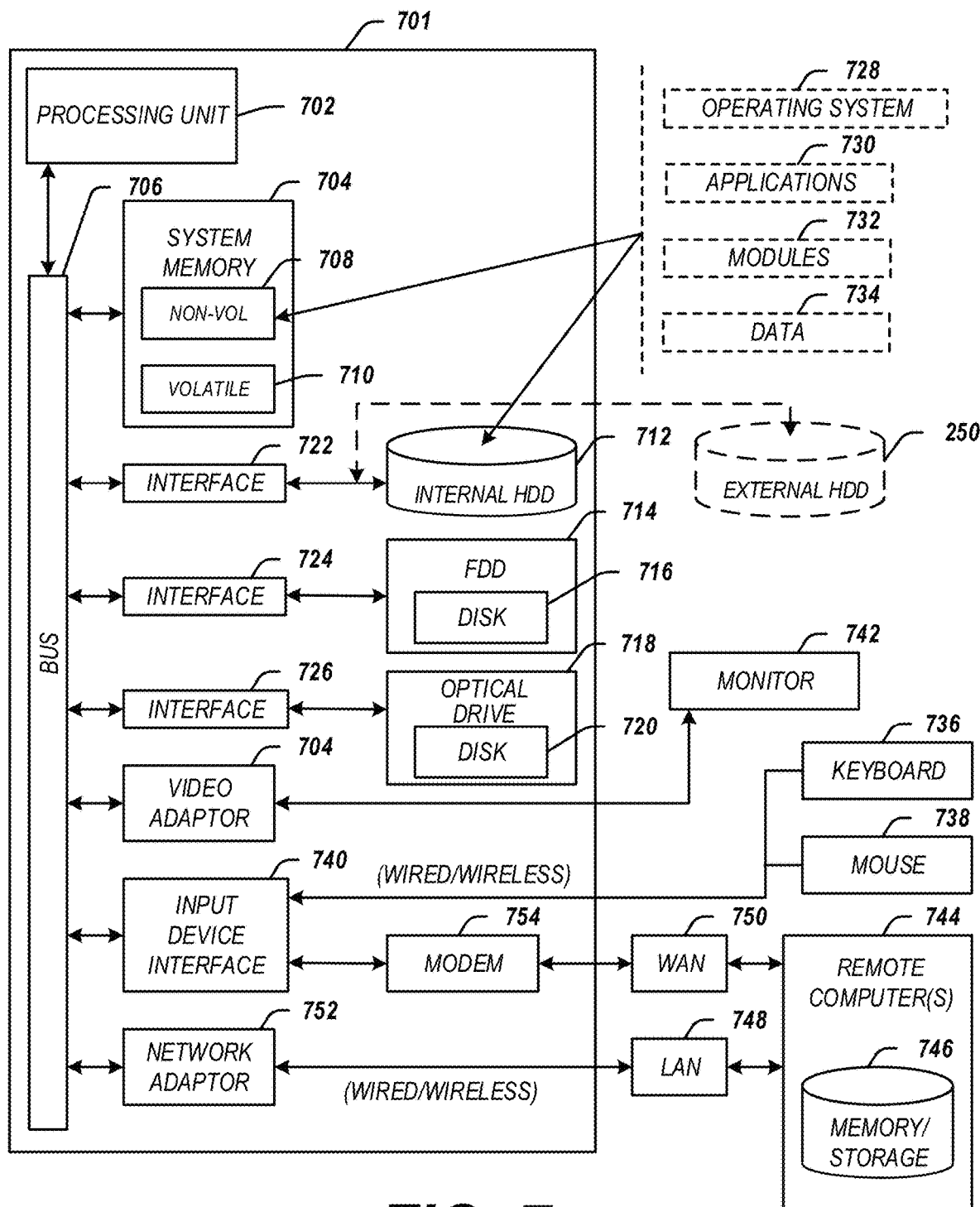
FIG. 7 is a block diagram illustrating an exemplary computing device suitable for use with exemplary embodiments.

The above-described methods may be embodied as instructions on a computer readable medium or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the communication system 500.

A user can enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 744. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
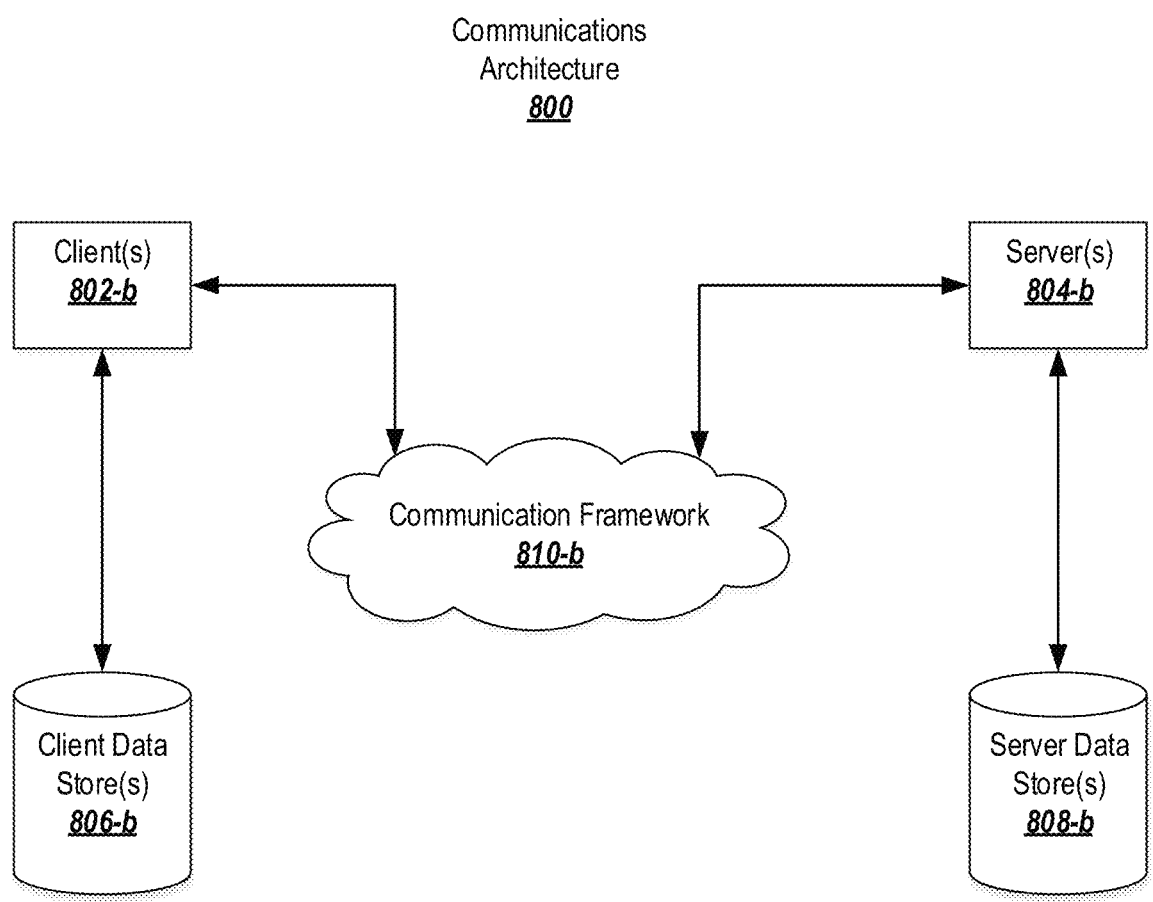
FIG. 8 depicts an exemplary communication architecture.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 may implement the client device 510. The servers 804 may implement the server device 526. The clients 802 and the servers 804 are operatively connected to one or more respective client data stores 806 and server data stores 808 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 9:
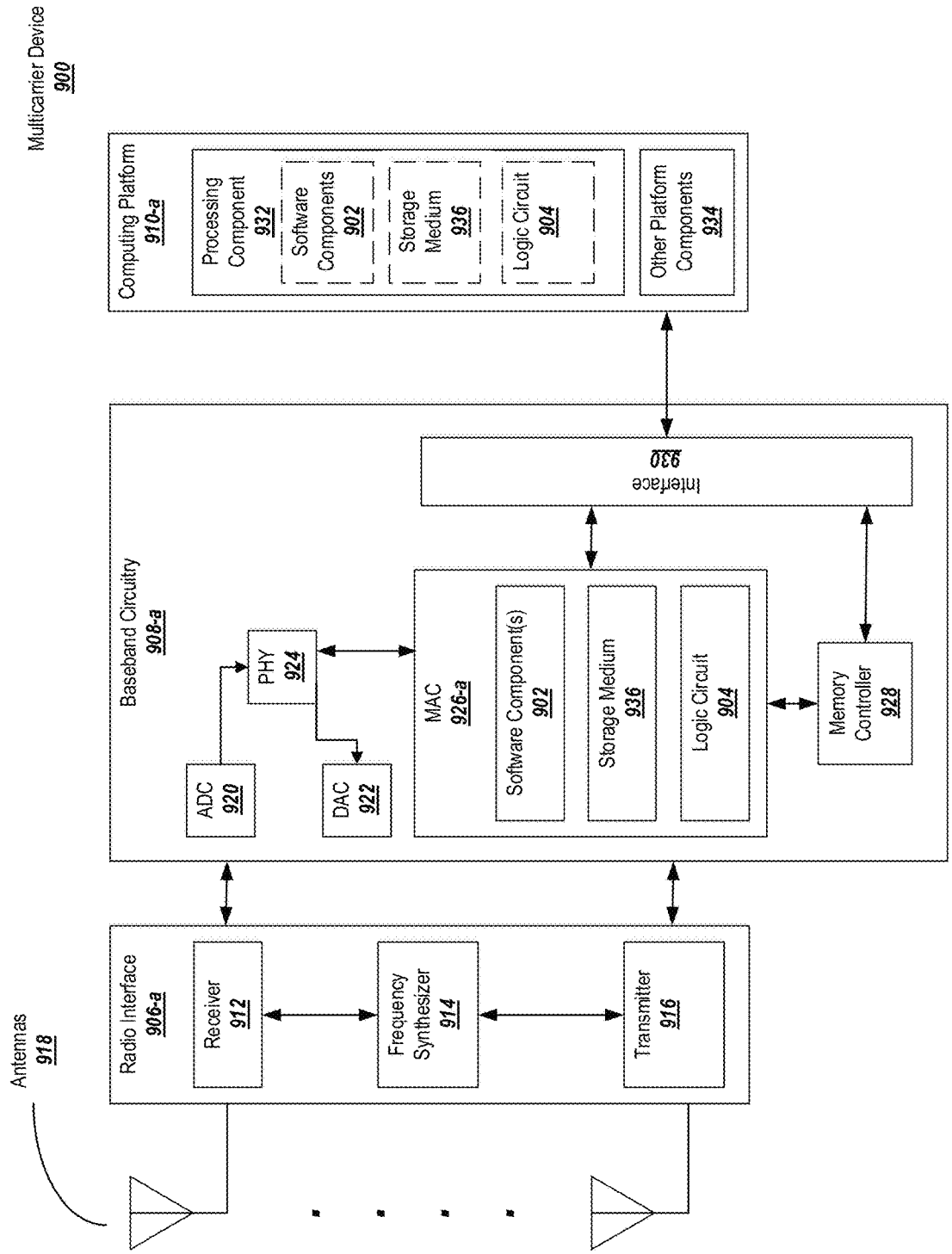
FIG. 9 is a block diagram depicting an exemplary multicarrier communications device.

FIG. 9 illustrates an embodiment of a device 900 for use in a multicarrier OFDM system, such as the communication system 500. The device 900 may implement, for example, software components 902 as described with reference to the messaging component logic 600, the intent determination logic 700, and the group selection logic 800. The device 900 may also implement a logic circuit 904. The logic circuit 904 may include physical circuits to perform operations described for the messaging system 600. As shown in FIG. 9, device 900 may include a radio interface 906, baseband circuitry 908, and a computing platform 910, although embodiments are not limited to this configuration.

The device 900 may implement some or all of the structure and/or operations for the communication system 500 and/or logic circuit 904 in a single computing entity, such as entirely within a single device. Alternatively, the device 900 may distribute portions of the structure and/or operations for the messaging system 600 and/or logic circuit 904 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 906 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio interface 906 may include, for example, a receiver 912, a transmitter 914 and/or a frequency synthesizer 916. The radio interface 906 may include bias controls, a crystal oscillator and/or one or more antennas 918. In another embodiment, the radio interface 906 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 908 may communicate with the radio interface 906 to process receive and/or transmit signals and may include, for example, an analog-to-digital converter 920 for down converting received signals, and a digital-to-analog converter 922 for up-converting signals for transmission. Further, the baseband circuitry 908 may include a baseband or physical layer (PHY) processing circuit 924 for PHY link layer processing of respective receive/transmit signals. The baseband circuitry 908 may include, for example, a processing circuit 926 for medium access control (MAC)/data link layer processing. The baseband circuitry 908 may include a memory controller 928 for communicating with the processing circuit 926 and/or a computing platform 910, for example, via one or more interfaces 930.

In some embodiments, the PHY processing circuit 924 may include a frame construction and/or detection module, in combination with additional circuitry such as a buffer memory, to construct and/or deconstruct communication frames, such as radio frames. Alternatively or in addition, the MAC processing circuit 926 may share processing for certain of these functions or perform these processes independent of the PHY processing circuit 924. In some embodiments, MAC and PHY processing may be integrated into a single circuit.

The computing platform 910 may provide computing functionality for the device 900. As shown, the computing platform 910 may include a processing component 932. In addition to, or alternatively of, the baseband circuitry 908, the device 900 may execute processing operations or logic for the communication system 500 and logic circuit 904 using the processing component 932. The processing component 932 (and/or the PHY 924 and/or MAC 926) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 910 may further include other platform components 934. Other platform components 934 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 900 described herein, may be included or omitted in various embodiments of the device 900, as suitably desired. In some embodiments, the device 900 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 900 may be implemented using single input single output (SISO) architectures. However, certain implementations may include multiple antennas (e.g., antennas 918) for transmission and/or reception using adaptive antenna techniques for beamforming or spatial division multiple access (SDMA) and/or using MIMO communication techniques.

The components and features of the device 900 may be implemented using any combination of discrete circuitry, application specific integrated circuits (ASICs), logic gates and/or single chip architectures. Further, the features of the device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 936 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising:
   displaying a first interface for a messaging inbox configured to present graphical or audio content associated with a sending user account, wherein
   the content is organized based on two hierarchical tiers, with a first hierarchical tier corresponding to the sending user account and a second hierarchical tier corresponding to the content,
   messages in the messaging inbox are each organized under and assigned to a particular graphical or audio content item, and
   the first interface comprises an account element associated with the sending user account and a preview of the content;
   receiving a selection of the account element; and
   in response to receiving the selection of the account element, displaying a second interface of the messaging inbox associated with the second hierarchical tier and comprising a visualization element configured to display a content item associated with the sending user account and any messages in the messaging inbox assigned to the content item, wherein
   the content is ephemeral content configured to expire under predefined conditions such that the visualization element will not display expired content, and
   the preview of the content in the first interface is a distorted preview of the ephemeral content.

2. A non-transitory computer-readable medium storing:
   instructions configured to cause one or more processors to display a first interface for a messaging inbox, configured to present graphical or audio content associated with a sending user account, wherein
   the content is organized based on two hierarchical tiers, with a first hierarchical tier corresponding to the sending user account and a second hierarchical tier corresponding to the content,
   messages in the messaging inbox are each organized under and assigned to a particular graphical or audio content item, and
   the first interface comprises an account element associated with the sending user account and a preview of the content;
   instructions configured to cause one or more processors to receive a selection of the account element; and
   instructions configured to cause one or more processors to, in response to receiving the selection of the account element, display a second interface of the messaging inbox associated with the second hierarchical tier and comprising a visualization element configured to display a content item associated with the sending user account and any messages in the messaging inbox assigned to the content item, wherein the content is ephemeral content configured to expire under predefined conditions such that the visualization element will not display expired content, and the preview of the content in the first interface is a distorted preview of the ephemeral content.

3. The medium of claim 2, further storing:

instructions configured to cause one or more processors to identify a reply to the content; and instructions configured to cause one or more processors to superimpose the reply on the content.

4. The medium of claim 2, further storing:

instructions configured to cause one or more processors to associate the content with a first messaging thread;

instructions configured to cause one or more processors to receive a reply to the content; and instructions configured to cause one or more processors to associate the reply with the first messaging thread if the reply consists of text, or associate the reply with a new second messaging thread if the reply comprises non-text content.

5. The medium of claim 2, further storing instructions configured to cause one or more processors to progressively darken the content with each reply received for the content.

6. The medium of claim 2, wherein the sending user account is associated with a plurality of content items, and further storing instructions configured to cause one or more processors to display a preview of the content items in the first interface.

7. The medium of claim 2, further storing instructions for: receiving a reply from the selected one of the receiving accounts, the reply comprising second content; and associating the second content with a second conversation tuple distinct from the first conversation tuple.

8. The medium of claim 2, further storing instructions for displaying an indicator of a number of content items available in the messaging inbox.

9. The medium of claim 2, further storing instructions for displaying a preview of a plurality of content items in a scrolling list in the first interface of the messaging inbox.

10. An apparatus comprising:

a display configured to display a first interface for a messaging inbox, the messaging inbox configured to present graphical or audio content associated with a sending user account, wherein the content is organized based on two hierarchical tiers, with a first hierarchical tier corresponding to the sending user account and a second hierarchical tier corresponding to the content, messages in the messaging inbox are each organized under and assigned to a particular graphical or audio content item, and the first interface comprises an account element associated with the sending user account and a preview of the content; and input logic, implemented at least partly in hardware, configured to receive a selection of the account element, wherein, in response to receiving the selection of the account element, the display is further configured to display a second interface of the messaging inbox associated with the second hierarchical tier and comprising a visualization element configured to display a content item associated with the sending user account and any messages in the messaging inbox assigned to the content item, wherein the content is ephemeral content configured to expire under predefined conditions such that the visualization element will not display expired content, and the preview of the content in the first interface is a distorted preview of the ephemeral content.

11. The apparatus of claim 10, further comprising:

conversation logic configured to associate the content with a first messaging thread; and a network interface configured to receive a reply to the content, wherein the conversation logic is further configured to associate the reply with the first messaging thread if the reply consists of text and to superimpose the text on the content, or to associate the reply with a new second messaging thread if the reply comprises non-text content.

12. The apparatus of claim 10, further comprising reply logic configured to progressively darken the content with each reply received for the content.

13. The apparatus of claim 10, wherein the sending user account is associated with a plurality of content items, and further comprising preview logic configured to display a preview of the content items in the first interface.

14. The apparatus of claim 10, further comprising reply logic configured to: receive a reply from the selected one of the receiving accounts, the reply comprising second content; and associate the second content with a second conversation tuple distinct from the first conversation tuple.

15. The apparatus of claim 10, wherein the display is further configured to display an indicator of a number of content items available in the messaging inbox.

16. The apparatus of claim 10, wherein the display is further configured to display a preview of a plurality of content items in a scrolling list in the first interface of the messaging inbox.

\* \* \* \* \*